United States Patent
Ashcraft et al.

(10) Patent No.: US 8,793,435 B1
(45) Date of Patent: Jul. 29, 2014

(54) LOAD MISS RESULT BUFFER WITH SHARED DATA LINES

(75) Inventors: Matthew W. Ashcraft, Belmont, CA (US); John Gregory Favor, Scotts Valley, CA (US); David A. Kruckemyer, San Jose, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 293 days.

(21) Appl. No.: 13/250,596

(22) Filed: Sep. 30, 2011

(51) Int. Cl.
*G06F 12/10* (2006.01)

(52) U.S. Cl.
USPC .................... 711/118; 711/125; 711/E12.017

(58) Field of Classification Search
USPC .................................. 711/118, 125, E12.017
See application file for complete search history.

(56) References Cited

U.S. PATENT DOCUMENTS

2007/0180221 A1* 8/2007 Abernathy et al. ........... 712/225

* cited by examiner

*Primary Examiner* — Yong Choe
(74) *Attorney, Agent, or Firm* — Amin, Turocy & Watson, LLP

(57) ABSTRACT

A load/store unit with an outstanding load miss buffer and a load miss result buffer is configured to read data from a memory system having a level one cache. Missed load instructions are stored in the outstanding load miss buffer. The load/store unit retrieves data for multiple dependent missed load instructions using a single memory access and stores the data in the load miss result buffer. The load miss result buffer includes dependent data lines, dependent data selection circuits, shared data lines and shared data selection circuits. The dependent data selection circuits are configured to select a subset of data from the memory system for storing in an associated dependent data line. Similarly, the shared data selection circuits are configured to select a subset of data from the memory system for storing in an associated shared data line.

26 Claims, 18 Drawing Sheets

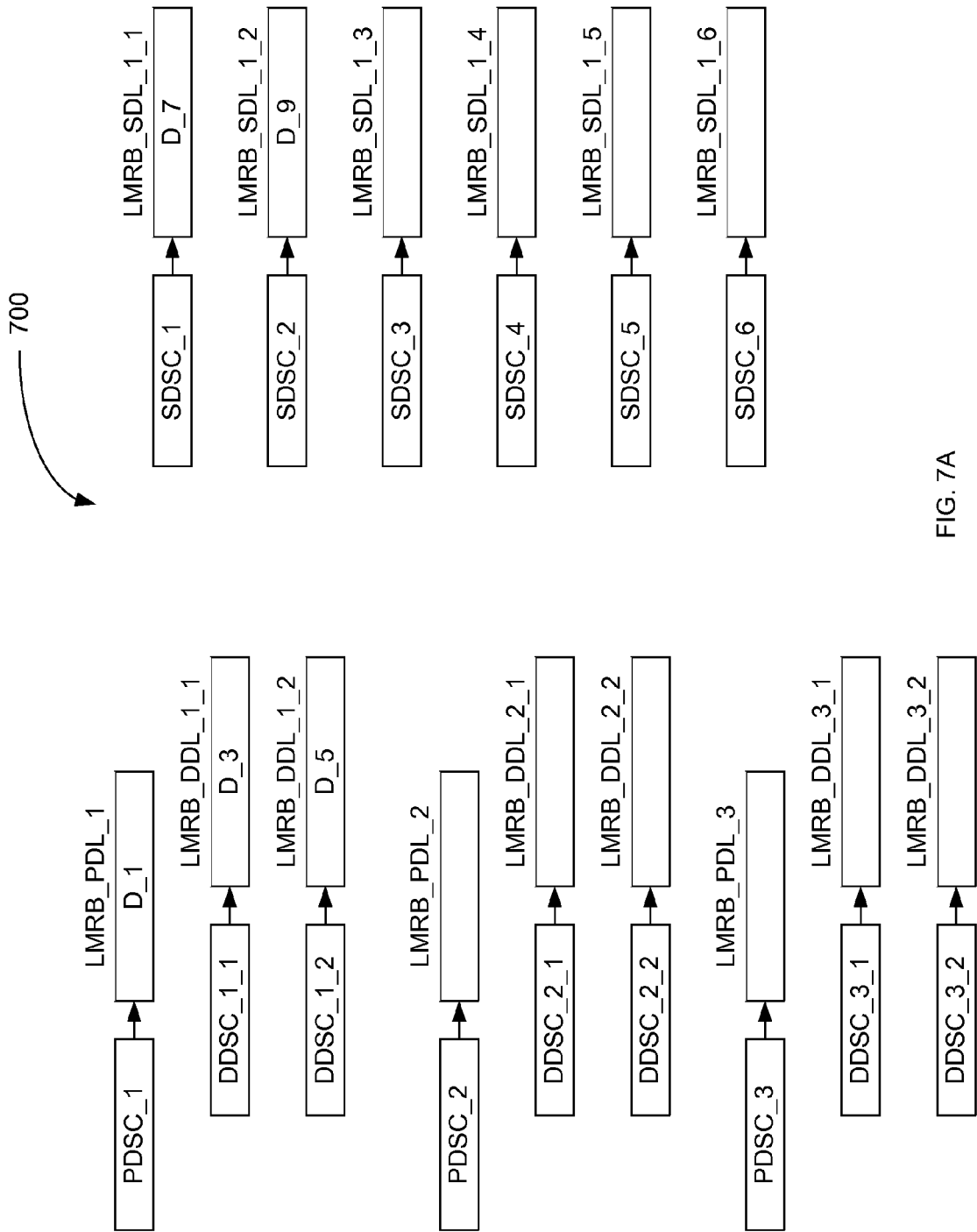

LOAD MISS RESULT BUFFER WITH SHARED DATA LINES

BACKGROUND

1. Background Field

The present invention relates to processing units and in particular to load store units.

2. Relevant Background

Processors, such as microprocessors, digital signal processors, and microcontrollers, are generally divided into many sub-systems, such as a memory system, a processing unit, and load store units. The load store unit transfers data between the processing units and the memory system.

Specifically, the load store unit reads (i.e. loads) data from the memory system and writes (i.e. stores) data to the memory system.

FIG. 1 shows a simplified block diagram of a load store unit 110 coupled to a memory system 140. Load store unit 110 includes an instruction decoder 111, a load scheduler 113, a load pipeline 115, outstanding load miss buffer 116, a store scheduler 117, format block 118, and a store pipeline 119. Memory system 140 includes a level one cache 142 and a level two memory sub-system 144. In various embodiments of memory system 140, level two memory sub-system 144 may include additional cache levels in addition to the main memory. In some processors, instruction decoder 111 may be part of another subsystem. Instruction decoder 111 decodes the program instructions and sends load instructions to load scheduler 113 and store instruction to store scheduler 117. Other types of instructions are sent to appropriate execution units, such as a floating point execution unit, or an integer execution unit. In most systems with multiple processing units, each processing unit includes a separate load/store unit. Store scheduler 117 schedules the store instructions and issue store instruction to store pipeline 119. Store pipeline 119 executes the store instruction and stores the data from the store instructions into memory system 140.

Load scheduler 113 schedules the load instructions and issue load instructions to load pipeline 115 for execution. Load pipeline 115 executes the load instructions and reads the requested data from memory system 140. In many load store units, load pipeline 115 includes a load execution pipeline and a load result pipeline. The load execution pipeline decodes the address and accesses the level one cache to determine if the data is in level one cache 142. If the requested data is in level one cache 142, the load result pipeline retrieves the data from level one cache 142. If the requested data is not in level one cache 142 (i.e. a cache miss), the load pipeline is stalled until the data is becomes available. However, load/store units that include an outstanding load miss buffer as in FIG. 1, allow other load operations to proceed while one or more missed load instruction is outstanding. The missed load instructions are stored in outstanding load miss buffer 116. Load instructions stored in outstanding load miss buffer 116 are re-issued when the data becomes available in level one cache 142. However, because the address has already been decoded, the re-issued load instructions can be re-issued directly to the load result pipeline.

When data is retrieved from level one cache 142, format block 118 formats the data to conform to the data format requested by the load instruction. For example, format block 118 would reduce the cache line of data from level one cache 142 to the subset of data requested by the load instruction. Format block 118 could also perform other formatting operations such as data alignment and endian conversion.

While the simplest way to issues load instructions is to issues the load instructions in order, greater performance may be achieved by issuing load instructions out of order. For example, if load scheduler 113 receives load instruction L_1, followed by load instruction L_2, followed by load instruction L_3 and load instruction L_1 has unresolved dependencies, load scheduler 113 may issue load instruction L_2 prior to load instruction L_1 rather than stalling and waiting for the dependencies of load instruction L_1 to resolve. Furthermore, load scheduler 113 may also issue load instruction L_3 while waiting for the dependencies of load instruction L_1 to resolve.

Furthermore, load instructions that miss in level one cache 142 are held in outstanding load miss buffer 116, so that later load instructions can issue. For example if load instruction L_1 misses level one cache 142, i.e. load instruction L_1 requests data that is not already in level one cache 142, then load instruction L_1 is stored in outstanding load miss buffer 116. This allows load scheduler 113 and load pipeline 115 to issue later load instructions such as a load instruction L_2. For clarity, load instructions that miss level one cache 142 are referred to as missed load instructions. Typically, outstanding load miss buffer 116 can hold several missed load instructions. Including missed load instructions for the same memory location. Once the cache line that is requested by the missed load instruction becomes available in level one cache 142, the missed load instructions can be reissued to load pipeline 115.

When the missed load instructions are reissued, various hazards may occur if the missed load instructions are reissued out of order. For example, if a missed load instruction L_1 and a missed load instruction L_3 (which should come after missed load instruction L_1) are to the same memory location, if missed load instruction L_3 is reissued before missed load instruction L_1, and a store instruction modifies the memory location after execution of missed load instruction L_3 and before the execution of missed load instruction L_1, then the data retrieved by missed load instruction L_1 and missed load instruction L_3 may be inaccurate. Because load scheduler 113 may have issued the missed load instructions out of order, outstanding load miss buffer 116 may not be aware of the actual order of the missed load instructions. Therefore, data hazards from out of order reissuance of the missed load instructions can occur. Accordingly, the tracking system to monitor all loads and store instruction to detect hazards caused by instructions that were issued out of order is further complicated by missed load instructions.

Hence there is a need for a method and system to eliminate potential data hazards when missed load instructions are reissued without using extensive resources.

SUMMARY

Accordingly, the present invention provides load/store units that can reissue missed load instructions without potential data hazards. Embodiments of the present invention can be used with systems having multiple processing units as well as single core processors. Specifically, in one embodiment of the present invention the load store unit, which includes a load scheduler, a load pipeline, an outstanding load miss buffer and a load miss result buffer, is configured to read data from a memory system having a level one data cache. The outstanding load miss buffer is configured to store missed load instructions and the load miss result buffer is configured to store data units (i.e. the data requested by the missed load instructions) for the missed load instructions. The load pipeline is configured to retrieve data units from the load miss result pipeline for re-issued missed load instructions rather than the level one data cache.

For example, a first missed load instruction and a second missed load instruction are stored in the outstanding load miss buffer. Specifically, the first load instruction is stored in a first primary entry of the outstanding load miss buffer and the second missed load instruction is stored in a dependent entry of the first primary entry if the second missed load instruction is dependent on the first missed load instruction. Additional missed load instructions that are dependent on the first missed load instructions are stored in additional dependent entries of the first primary entry or in shared entries. Shared entries that are used for missed load instructions that are dependent on the first missed load instruction in the first primary entry are associated with the first primary entry.

A first data unit, requested by the first missed load instruction, and a second data unit, requested by the second missed load instruction, are retrieved by a first memory access and stored in the load miss result buffer. For example, the first data unit is selected using a primary data selection circuit and stored in a primary data line. The second data unit is selected by a dependent data selection circuit and stored in a dependent data line. Additional data units may be selected using shared data selection circuits and stored in shared data lines.

When the first load missed load instruction is re-issued the first data unit is read from the load miss result buffer instead of the level one data cache. Similarly, when the second load instruction is re-issued the second data unit is read from the load miss result buffer rather than the level one data cache. Because the first data unit and the second data unit are retrieved and stored in the load miss result buffer, other instructions that may modify the data in the level one data cache would not cause hazards with the missed load instructions.

The present invention will be more fully understood in view of the following description and drawings.

BRIEF DESCRIPTION OF THE DRAWINGS

FIGS. 7A-7C are simplified diagrams illustrating the use of a load miss result buffer in accordance with one embodiment of the present invention.

DETAILED DESCRIPTION

As explained above, load schedulers that support issuing unlimited out of order load instructions require tracking systems to detect and resolve hazards. Additional complications to the tracking systems are created when missed load instructions are stored and then reissued when the requested data becomes available in the data cache. However, in accordance with the present invention a novel load store unit can store and reissue missed load instructions without the need for complicated tracking systems. Furthermore, the present invention can be used in systems having multiple processing units as well as single core processors.

Figure 1:
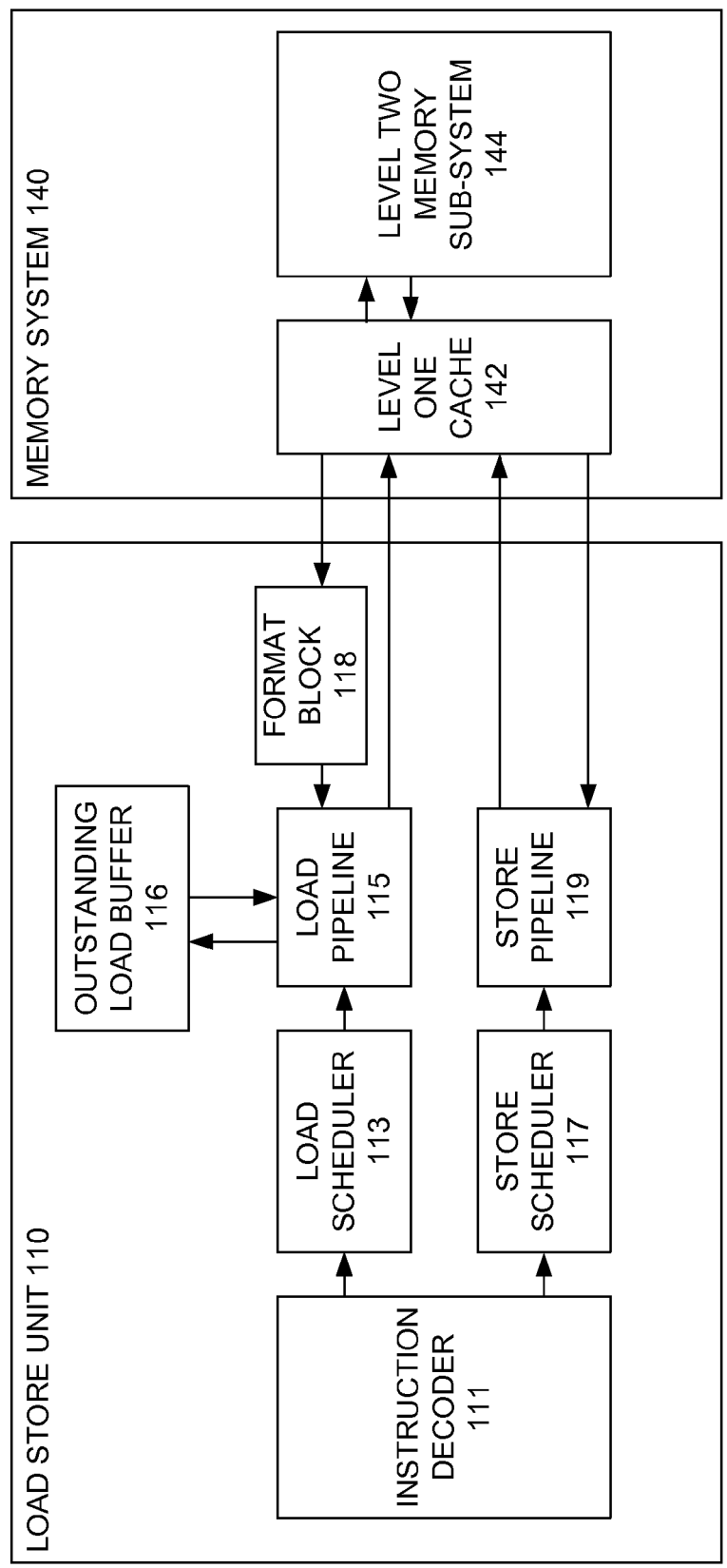
FIG. 1 is a simplified block diagram of a load store unit and a memory system.
Figure 2:
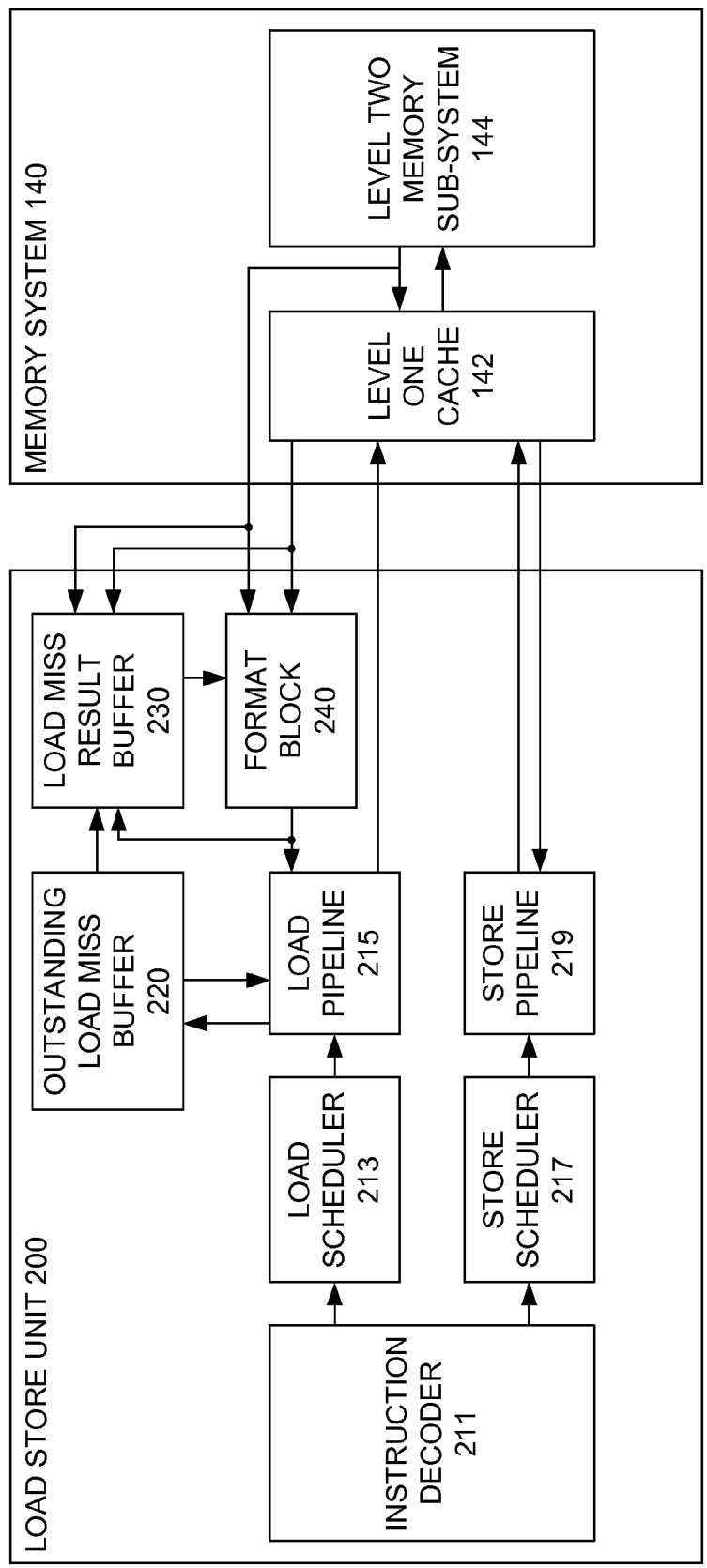
FIG. 2 is a simplified block diagram of a load store unit in accordance with one embodiment of the present invention.

FIG. 2 shows a simplified block diagram of load store unit 200 in accordance with one embodiment of the present invention. Like load store unit 110, load store unit 200 works with memory system 140. Load store unit 200 includes an instruction decoder 211, a load scheduler 213, a load pipeline 215, a store scheduler 217, a store pipeline 219, an outstanding load miss buffer 220, a load miss result buffer 230, and a format block 240. Instruction, decoder 211, load scheduler 213, load pipeline 215, store scheduler 217, and store pipeline 219 perform the same functions as instruction decoder 111, load scheduler 113, load pipeline 115, store scheduler 117, and store pipeline 119 in load store unit 110 described above. However, outstanding load miss buffer 220 and format block 240 are modified to use load miss result buffer 230 to eliminate hazards in missed load instructions in accordance with the present invention. In some embodiments of the present invention, load scheduler 213 and store scheduler 217 are combined into a single scheduler. Similarly, load pipeline 215 and store pipeline 219 could also be combined as a single pipeline.

Figure 3:
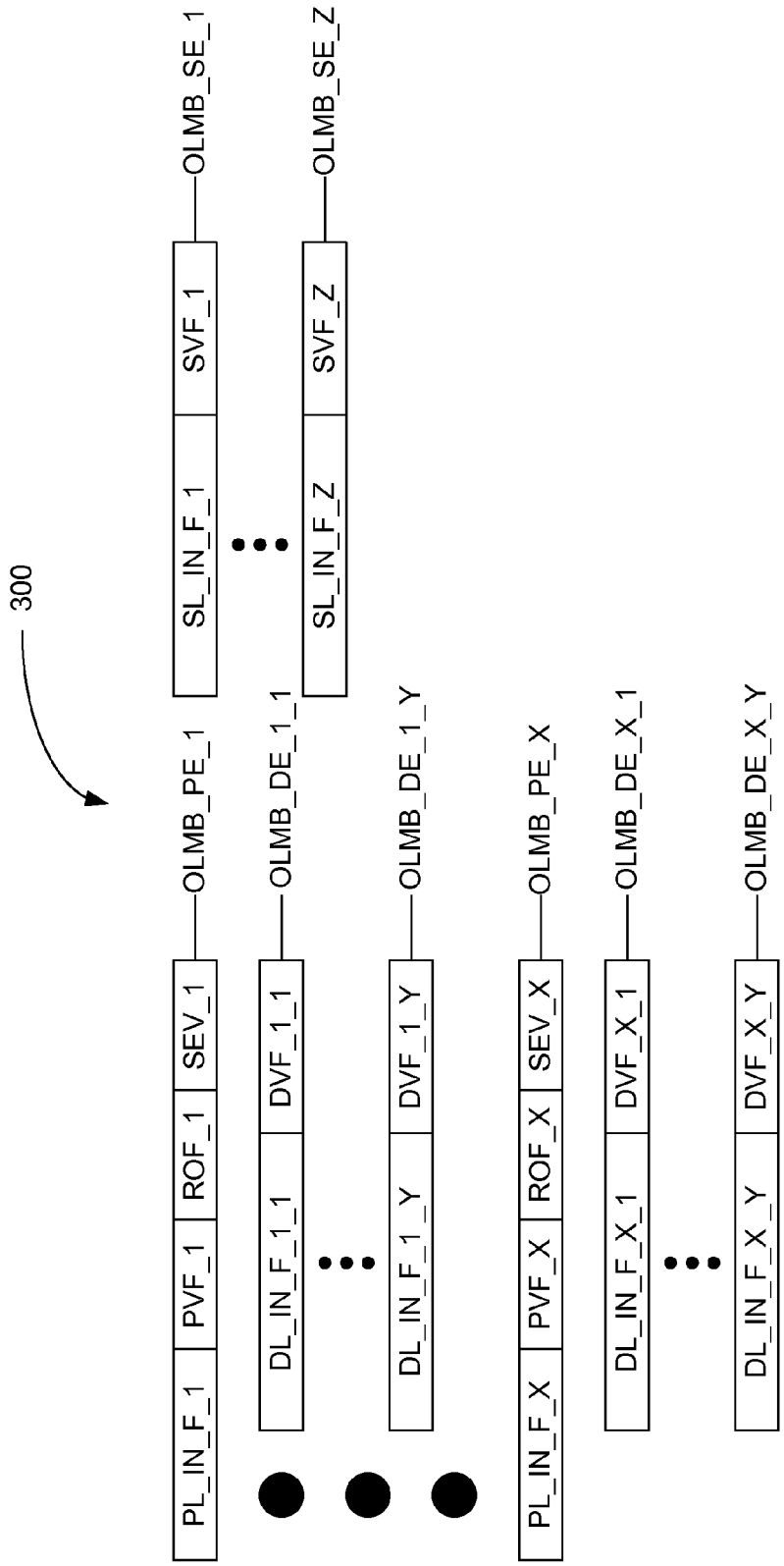
FIG. 3 is a simplified diagram of an outstanding load miss buffer in accordance with one embodiment of the present invention.

Missed load instructions are stored in outstanding load miss buffer 220. Outstanding load miss buffer 220 is organized so that missed load instructions to the same memory address or same cache line (in some embodiments) can be grouped together. For clarity missed load instructions requesting the same memory address or same cache line are often referred to as dependent missed load instructions. Grouping of dependent missed load instruction is used to track when missed load instruction can be reissued. Specifically, when the cache line containing the data for a group of dependent missed load instructions is put into level one cache 142, all of the dependent missed load instructions become ready for reissue. FIG. 3, which is described below, illustrates the grouping of dependent missed load instruction using a novel outstanding load miss buffer in accordance with one embodiment of the present invention. However, other methods and system of grouping dependent missed load instructions can be used with the present invention. For example, the grouping of dependent missed load instruction in another embodiment of the present invention is performed by assigning a group ID to the missed load instructions. A group of dependent missed load instructions would receive the same group ID.

When the cache line requested by a missed load instruction is received in level one cache 142, the data from the cache line is transferred to load miss result buffer 230. Then as the missed load instructions that use that cache line are re-issued, the data is read from load miss result buffer 230 rather than from level one cache 142. Therefore, other instructions can modify the data in level one cache 142 without creating data hazards with the missed load instructions that use the data which have been transferred to load miss result buffer 230. As stated above in many load store units the load pipeline includes a load execution pipeline and a load results pipeline. Generally, re-issued missed load instructions need only be issued to the load results pipeline.

In some embodiments of the present invention load miss result buffer receives data from the entire cache line. In other embodiments of the present invention, load miss result buffer receives a subset of the data from a cache line. In general, if load miss result buffer receives data from the entire cache line, then missed load instructions can be grouped together if the data requested by each missed load instruction is on the same cache line. However, load miss result buffer would need to be a wide buffer with the same width as the cache line. In other embodiments of the present invention, the width of load miss result buffer 230 is reduced, by only copying data from a subset of the cache line (e.g. the specific data requested by the missed load instruction). However, the missed load instructions can only be grouped together only if each missed load instruction request data from the same subset of data that is stored in load miss result buffer 230.

Figure 5:
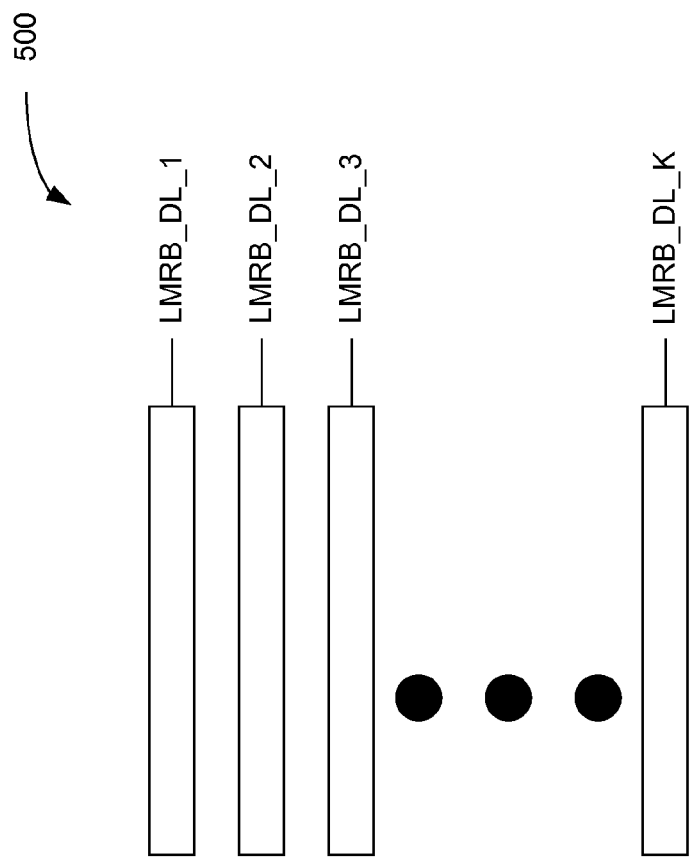
FIG. 5 is as simplified diagram of a load miss result buffer in accordance with one embodiment of the present invention.

In still other embodiments of the present invention, each missed instruction in the outstanding load miss buffer has a corresponding entry in the load miss result buffer. Only the specific data unit for each missed load instruction is stored in the corresponding entry of the load miss result buffer. FIG. 5, which is described below, illustrates a novel load miss result buffer in accordance with an embodiment of the present invention in which missed load instructions to the same cache line can be grouped together.

In still other embodiments of the present invention the data from the cache line is not transferred until a first dependent missed load instruction is reissued from a group of dependent missed load instructions. For example in one embodiment of the present invention, when the first dependent missed load instruction of a first group of dependent missed load instructions is re-issued, the data from the cache line is simultaneously read for the entire first group of dependent missed load instructions. Specifically, the requested data unit for the first dependent missed load instruction is provided to the load pipeline while the requested data units for the other dependent missed load instructions of the first group of dependent missed load instructions are stored in load miss result buffer 230. As other missed load instructions from the first group of dependent missed load instructions are reissued the data unit is retrieved from the load miss result buffer instead of level one cache 142. Therefore, other instructions that may change the data in level one cache 142 would not cause data hazards with regards to the first group of dependent missed load instructions. To minimize data transfers, in some embodiments of the present invention the appropriate data is stored in load miss result buffer 230 and level one cache 142 in parallel. Specifically, load miss result buffer 230 stores the appropriate data in the same memory transaction that transfers the requested cache line from level two memory sub-system 144 into level one cache 142.

The data from load miss result buffer 230 may be formatted by format block 240 before being provided to load pipeline 215. In other embodiments of the present invention, the data can be formatted by format block 240 before being stored in load miss result buffer 230. In still other embodiments of the present invention, some formatting is performed by format block 240 before the data is stored in load miss result buffer 230 as well as when the data is read from load miss result buffer 230.

FIG. 3 is a simplified block diagram of an outstanding load miss buffer 300 in accordance with one embodiment of the present invention. Outstanding load miss buffer 300 includes a plurality of outstanding load miss buffer primary entries (hereinafter referred to as OLMB primary entries). The OLMB primary entries are labeled OLMB_PE_x, where x can be 1 to X (i.e. there are X OLMB primary entries). Each OLMB primary entry of outstanding load miss buffer 300 includes a plurality of outstanding load miss buffer dependent entries (hereinafter referred to as OLMB dependent entries), which are labeled OLMB_DE_x_y, where y can be 1 to Y (i.e. each OLMB primary entry has Y OLMB dependent entries). Specifically, OLMB primary entry OLMB_PE_1 has OLMB dependent entry OLMB_DE_1_1 to OLMB dependent entry OLMB_DE_1_Y and OLMB primary entry OLMB_PE_X has OLMB dependent entry OLMB_DE_X_1 to OLMB dependent entry OLMB_DE_X_Y. In addition to the OLMB primary entries and OLMB dependent entries, outstanding load miss buffer 300 also includes a plurality of outstanding load miss buffer shared entries (hereinafter OLMB shared entries), which are labeled OLMB_SE_z, where z can be 1 to Z (i.e. there are Z OLMB shared entries). Generally, as missed load instructions are stored in outstanding load miss buffer 300, a missed load instruction that is not dependent on any other missed load instruction already in outstanding load miss buffer 300 are stored in an OLMB primary entry. However, if a second missed load instruction is dependent on a first missed load instruction that is in a first OLMB primary entry, then the second missed instruction is placed in a OLMB dependent entry of the first OLMB primary entry containing the first missed load instruction. However, if all the dependent entries of the first OLMB primary entry are full, the second missed load instruction is stored in one of the OLMB shared entries, which is associated with the first OLMB primary entry. An example to further demonstrate the function of an outstanding load miss buffer provided below and illustrated in FIGS. 4A-4J.

Each OLMB primary entry OLMB_PE_x (where x can be 1 to X) of outstanding load miss buffer includes a primary load instruction field PL_IN_F_x, a primary valid flag PVF_x, a request outstanding flag ROF_x, and a OLMB shared entry vector SEV_1. Primary load instruction field PL_IN_F_x contains the missed load instruction and information for reissuing the missed load instruction through the load results pipeline. For example, formatting information and destination register information are stored in the primary load instruction field. Primary valid flag PVF_x indicates whether OLMB primary entry OLMB_PE_x contains a valid missed load instruction. Generally, when a missed load instruction is stored in primary load instruction field PL_IN_F_x, primary valid flag PVF_x is set to a valid state (VAL). When the missed load instruction in primary load instruction field PL_IN_F_x is reissued primary valid flag PVF_x is set to an invalid state (INV). Request outstanding flag ROF_x indicates whether the requested data has become available in level one cache 142. Generally, when the missed load instruction is stored OLMB primary entry OLMB_PE_x, request outstanding flag ROF_x is set to an outstanding state (OUT) indicating that the request for data is still outstanding. When the requested data is moved into level one cache 142, request outstanding flag ROF_x is set to a filled state (FIL) indicating that the request has been filled and the data is ready to be read from level one cache 142. OLMB shared entry vector SEV_x is used to indicate which OLMB shared entries should be grouped with OLMB primary entry OLMB_PE_x. As explained above, when a new missed load instruction is dependent on a missed load instruction in a OLMB primary entry (e.g. OLMB_PE_x), and the dependent entries are already full, the new missed load instruction is stored in a OLMB shared entry and OLMB shared entry vector of the OLMB primary entry (OLMB_PE_x) is marked to indicate that the OLMB shared entry is associated with the OLMB primary entry. For example, in one embodiment of the present invention, a OLMB shared entry vector SEV_x includes one bit for each OLMB shared entry. A bit is set to a valid state if the corresponding OLMB shared entry contains a dependent missed load instruction otherwise the bit is set to an invalid state. In other embodiments of the present invention, each OLMB entry may contain additional fields. For example a specific embodiment of the present invention includes a field for the physical address of the missed load instruction.

Each OLMB dependent entry OLMB_DE_X_y of outstanding load miss buffer 300 includes a dependent load instruction field DL_IN_F_X_y and a dependent valid flag DVF_X_y. Dependent load instruction field DL_IN_F_X_y contains the missed load instruction and information for reissuing the missed load instruction through the load results pipeline. Dependent valid flag DVF_X_y indicates whether OLMB dependent entry OLMB_DE_X_y contains a valid missed load instruction.

FIGS. 4A-4J illustrate the performance of an outstanding load miss buffer 400 in accordance with one embodiment of the present invention. Outstanding load miss buffer includes 8 OLMB primary entries OLMB_PE_1, OLMB_PE_2, OLMB_PE_3, ... OLMB_PE_8 (however for space reasons only the first 3 OLMB primary entries are shown). Each OLMB primary entry OLMB_PE_x includes two dependent entries OLMB_DE_x_1 and OLMB_DE_x_2 (again for space reasons only the first 6 dependent entries are shown). In addition, outstanding load miss buffer 400 includes six OLMB shared entries OLMB_SE_1, OLMB_SE_2, ... OLMB_SE_6. Ten missed load instructions ML_1, ML_2, ML_3, ML_4, ... ML_10 are issued and need to be stored in outstanding load miss buffer 400. In this example, missed load instructions ML_1, ML_3, ML_5, ML_7, and ML_9 are request data from a first cache line and are considered to be dependent upon each other. Missed load instructions ML_2, ML_6, ML_8, and ML_10 request data from a second cache line and are considered to be dependent upon each other. Missed load instruction ML_4 requests data from a third cache line.

Figure 4A:
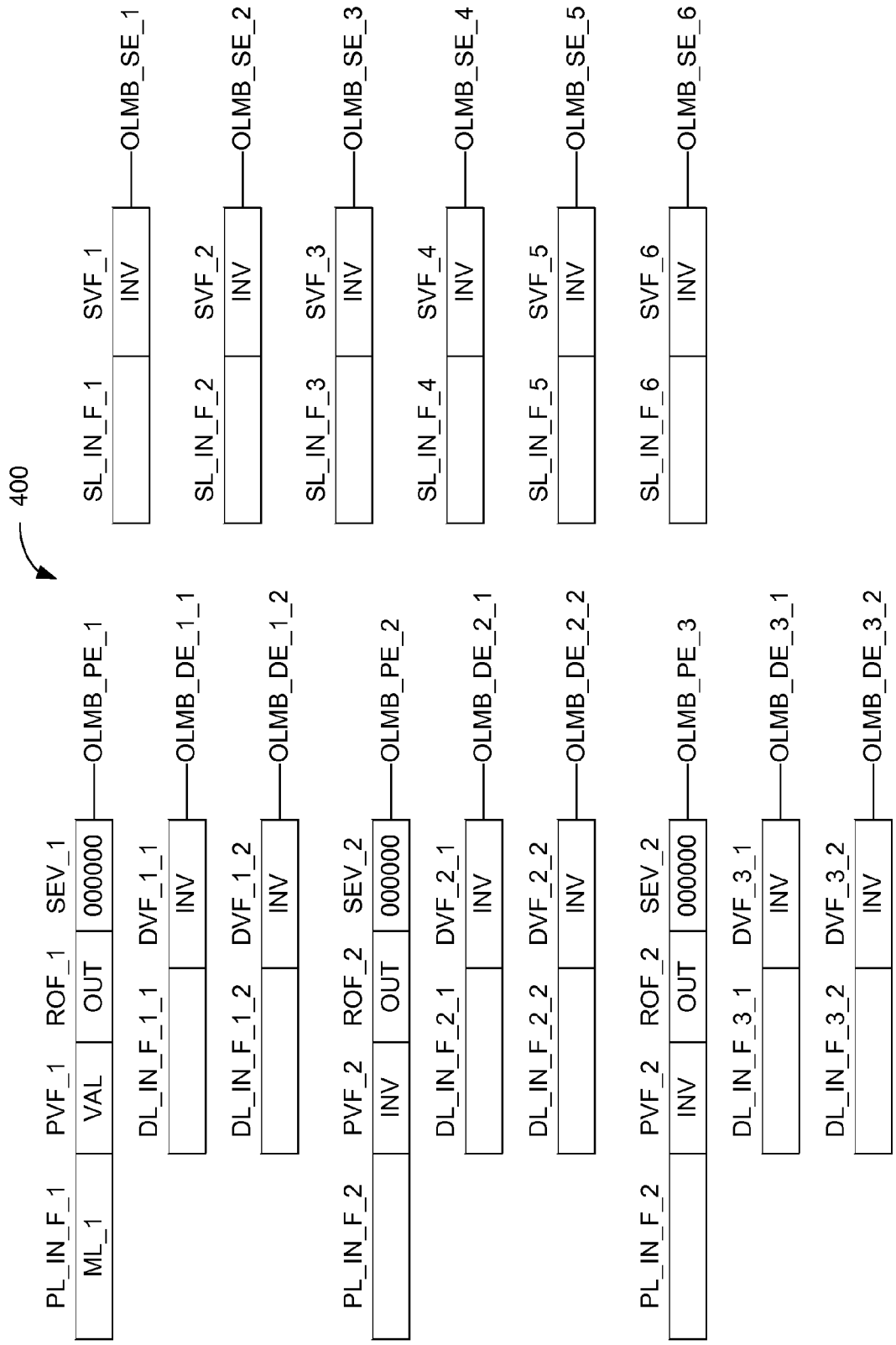
FIGS. 4A-4J are simplified diagrams illustrating the use of a outstanding load miss buffer in accordance with one embodiment of the present invention.

As illustrated in FIG. 4A, missed load instruction MF_1 is stored in primary load instruction field PL_IN_F_1 of OLMB primary entry OLMB_PE_1. Primary valid flag PVF_1 of OLMB primary entry OLMB_PE_1 is set to a valid state VAL, request outstanding flag ROF_1 of OLMB primary entry OLMB_PE_1 is set to an request outstanding state OUT, and shared entry vector SEV_1 of OLMB primary entry OLMB_PE_1 is set to 000000, which indicates that none of the OLMB shared entries are grouped with OLMB primary entry OLMB_PE_1. Specifically, in outstanding load miss buffer 400, shared entry vectors are 6 bit entries with each bit corresponding to one of the OLMB shared entries. Specifically the leftmost bit in FIG. 4A-4L corresponds to OLMB shared entry OLMB_SE_1, the second bit from the left corresponds to OLMB shared entry OLMB_SE_2, and in general the zth bit from the left corresponds to OLMB shared entry OLMB_SE_z. A bit value of 1 indicates that the corresponding OLMB shared entry is associated with the OLMB primary entry. A bit value of 0 indicates that the corresponding OLMB shared entry is not associated with the OLMB primary entry. In FIG. 4A the other entries besides OLMB primary entry OLMB_PE_1 are empty and thus the valid flags are all set to invalid state INV, the request outstanding flags are set to outstanding state OUT and the other shared entry vectors are all set to 000000.

Figure 4B:
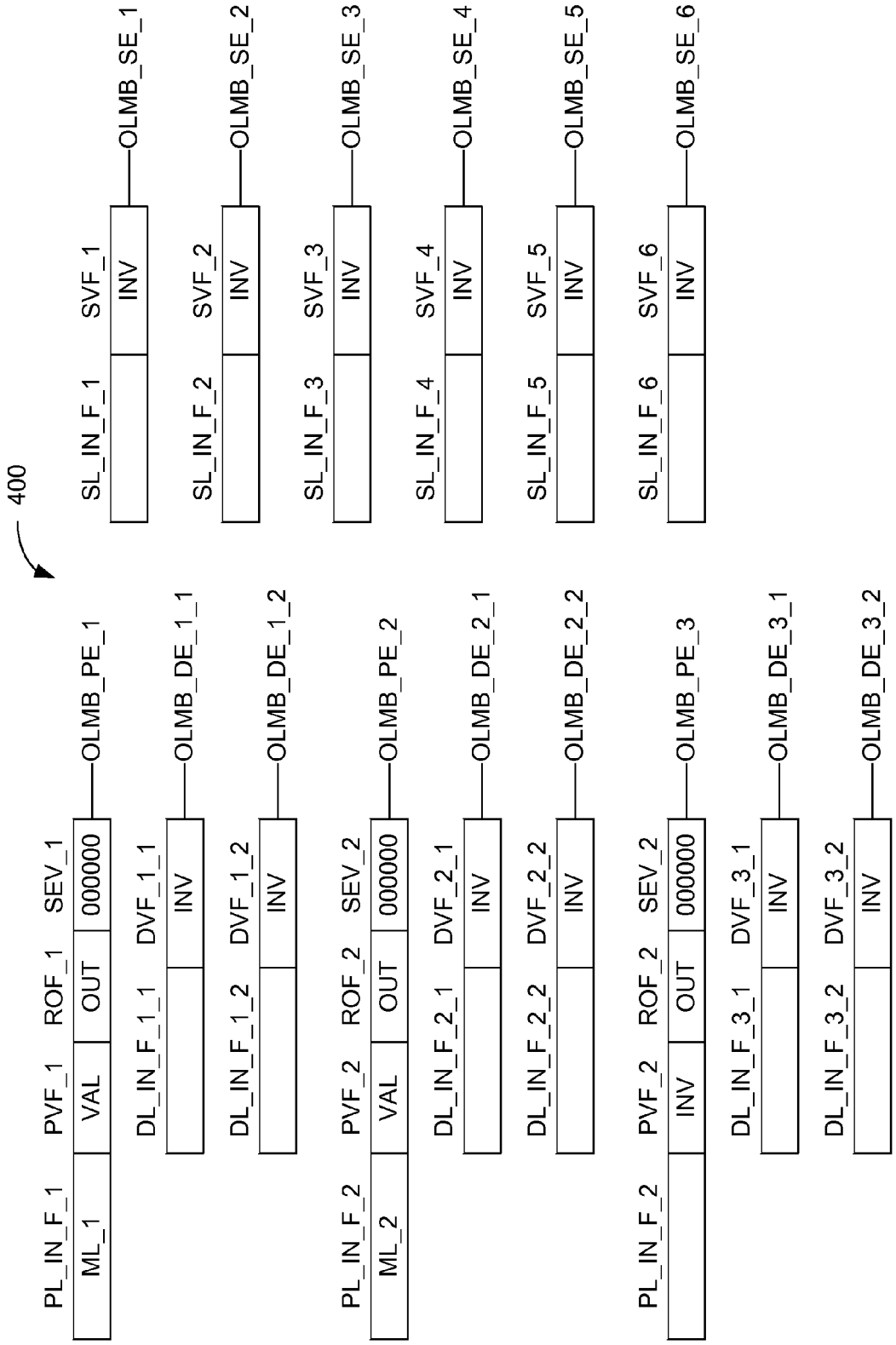

In FIG. 4B, missed load instruction ML_2 was issued and stored in outstanding load miss buffer 400. As stated above, missed load instruction ML_2 requests data from a different cache line than missed load instruction ML_1. Therefore, missed load instruction ML_2 is not dependent on missed load instruction ML_1. Accordingly, missed load instruction ML_2 is stored in primary load instruction field PL_IN_F_2 in OLMB primary entry OLMB_PE_2. In addition, primary valid flag PVF_2 of OLMB primary entry OLMB_PE_2 is set to valid state VAL, request outstanding flag ROF_2 of OLMB primary entry OLMB_PE_2 is set to request outstanding state OUT, and shared entry vector SEV_2 of OLMB primary entry OLMB_PE_2 is set to 000000.

Figure 4C:
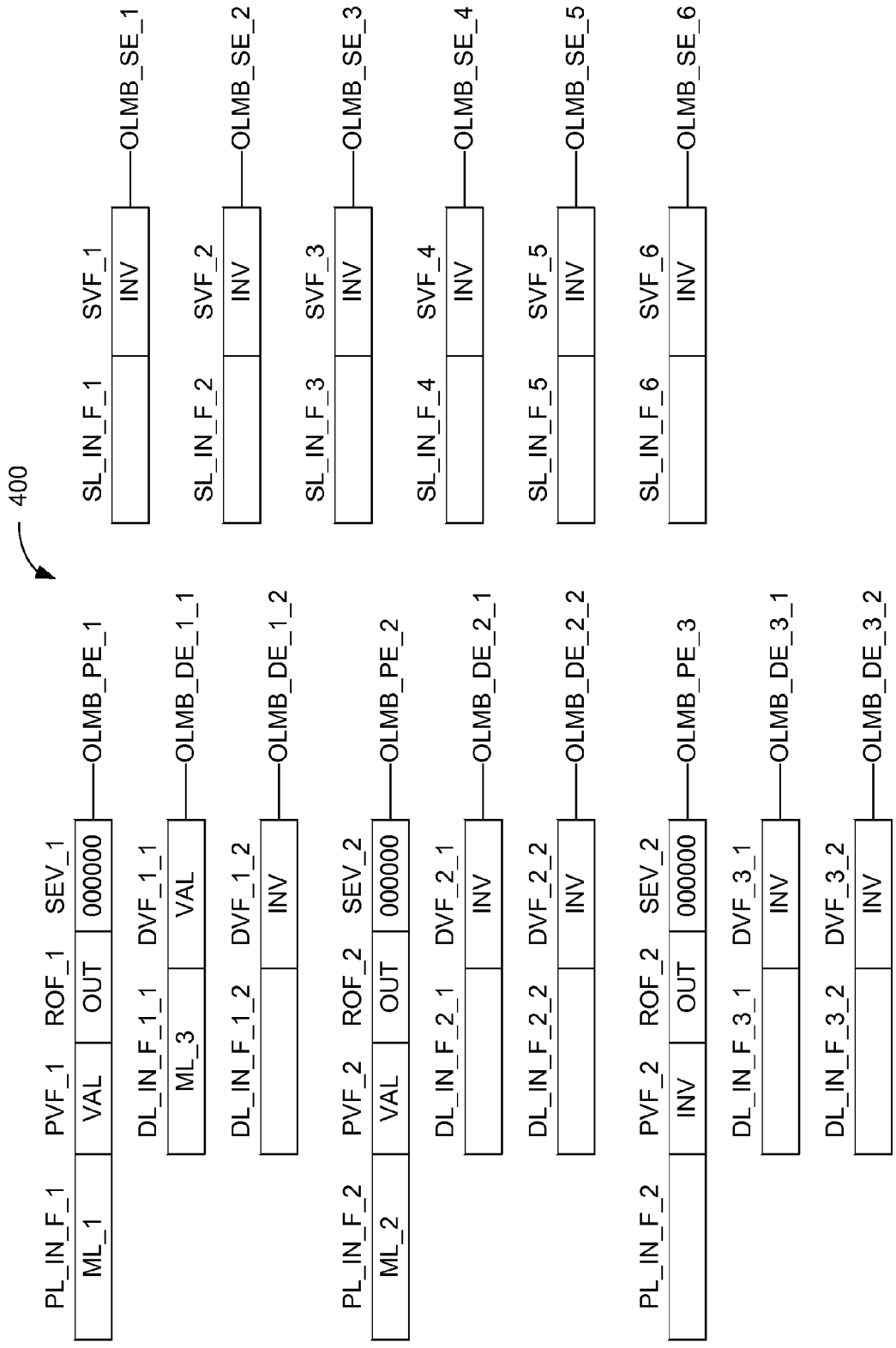

In FIG. 4C, missed load instruction ML_3 was issued and stored in outstanding load miss buffer 400. As stated above, missed load instruction ML_3 requests data from the same cache line as missed load instruction ML_1. Therefore, missed load instruction ML_3 is dependent on missed load instruction ML_1. Accordingly, missed load instruction ML_3 is stored in an OLMB dependent entry of OLMB primary entry OLMB_PE_1. Specifically, missed load instruction ML_3 is stored in dependent load instruction field DL_IN_F_11 in OLMB dependent entry OLMB_DE_1_1. In addition, dependent valid flag DVF_1_1 of OLMB dependent entry OLMB_DE_1_1 is set to valid state VAL.

Figure 4D:
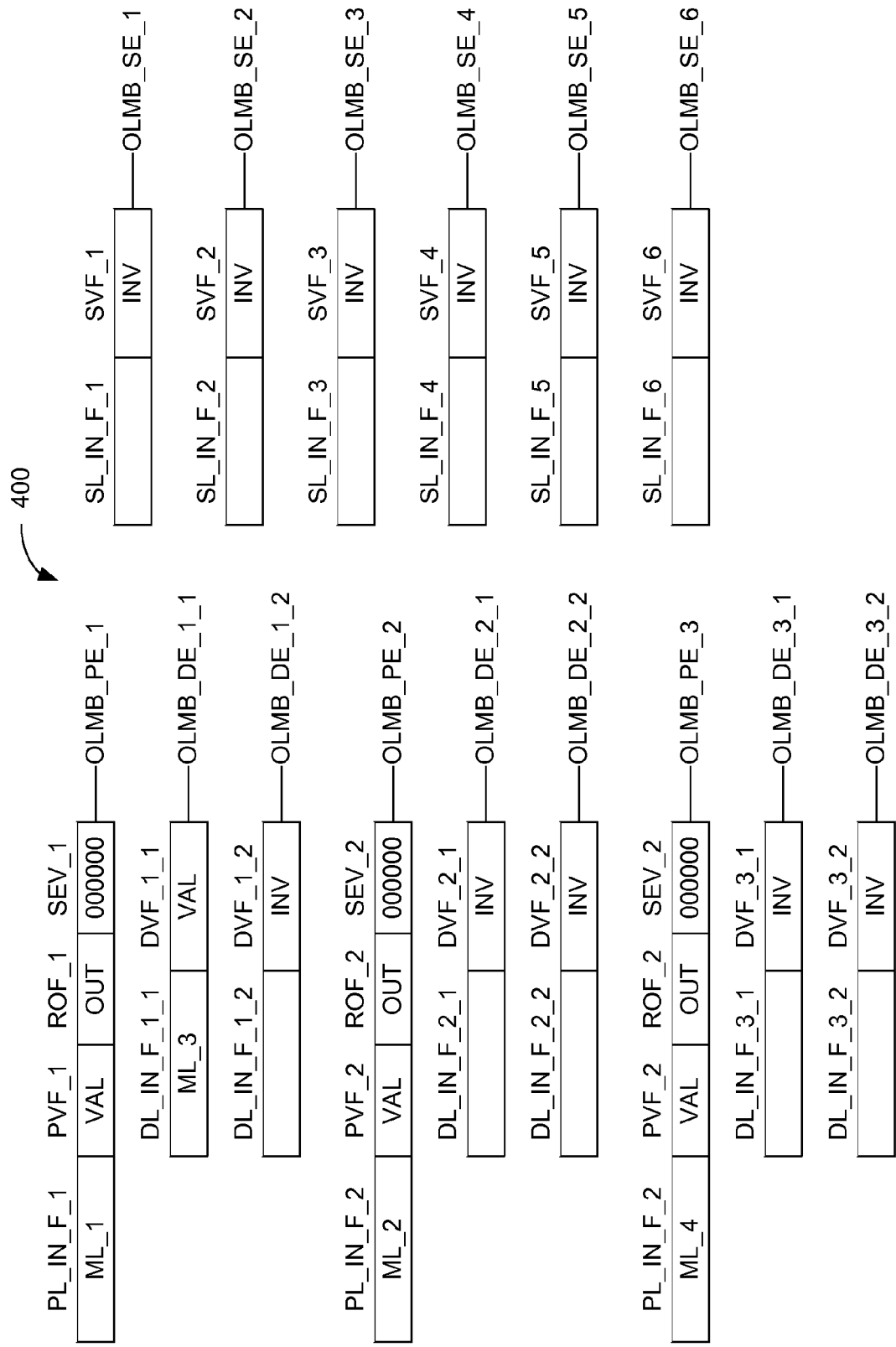

In FIG. 4D, missed load instruction ML_4 was issued and stored in outstanding load miss buffer 400. As stated above, missed load instruction ML_4 requests data from a different cache line than missed load instruction ML_1 and missed load instruction ML_2. Therefore, missed load instruction ML_4 is not dependent on missed load instruction ML_1 nor on missed load instruction ML_2. Accordingly, missed load instruction ML_4 is stored in primary load instruction field PL_IN_F_3 in OLMB primary entry OLMB_PE_3. In addition, primary valid flag PVF_3 of OLMB primary entry OLMB_PE_3 is set to valid state VAL, request outstanding flag ROF_3 of OLMB primary entry OLMB_PE_3 is set to request outstanding state OUT, and shared entry vector SEV_3 of OLMB primary entry OLMB_PE_3 is set to 000000.

Figure 4E:
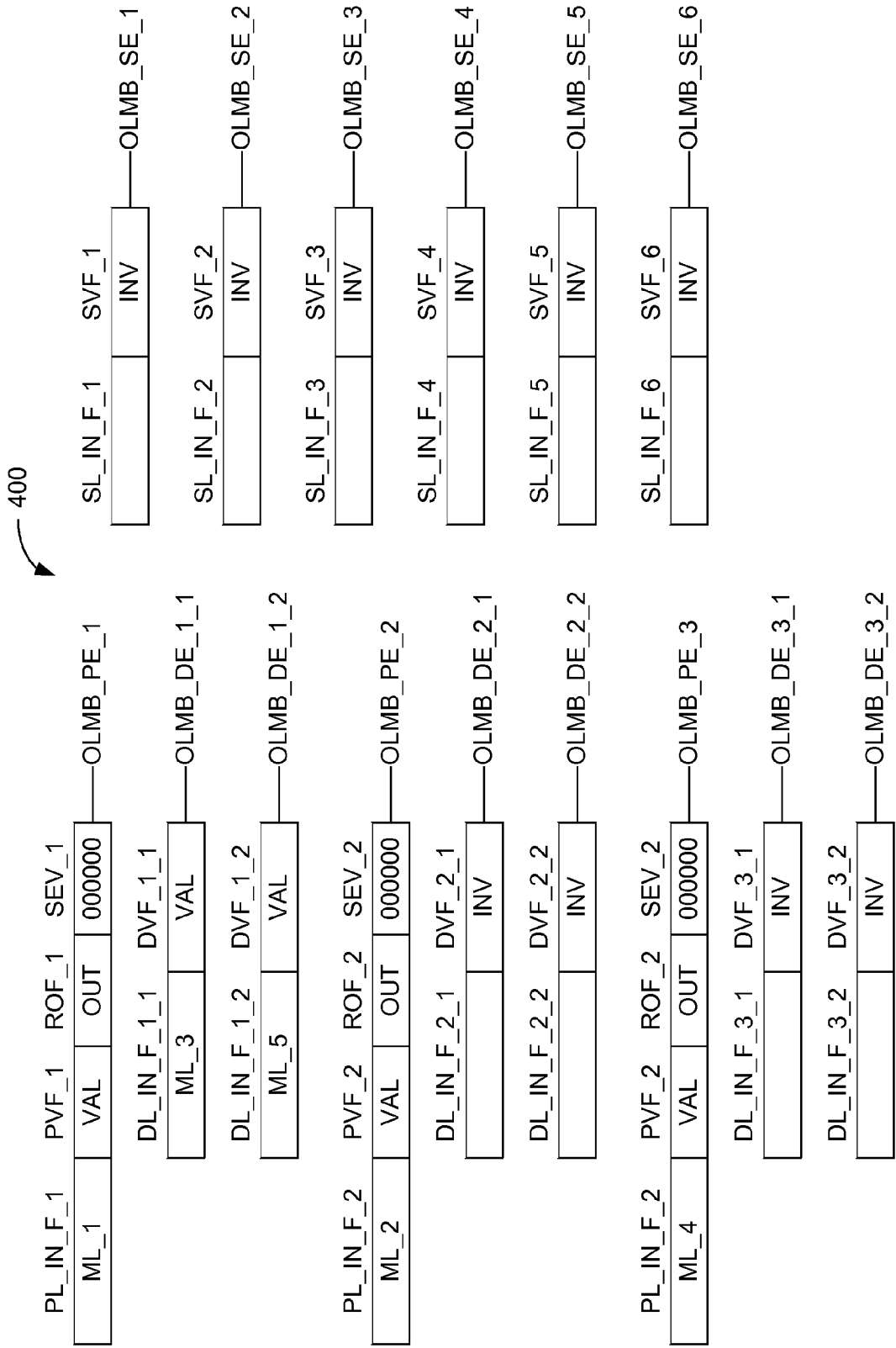

In FIG. 4E, missed load instruction ML_5 was issued and stored in outstanding load miss buffer 400. As stated above, missed load instruction ML_5 requests data from the same cache line as missed load instruction ML_1. Therefore, missed load instruction ML_5 is dependent on missed load instruction ML_1. Accordingly, missed load instruction ML_5 is stored in an OLMB dependent entry of OLMB primary entry OLMB_PE_1. Specifically, missed load instruction ML_5 is stored in dependent load instruction field DL_IN_F_1_2 in OLMB dependent entry OLMB_DE_1_2. In addition, dependent valid flag DVF_1_2 of OLMB dependent entry OLMB_DE_1_2 is set to valid state VAL.

Figure 4F:
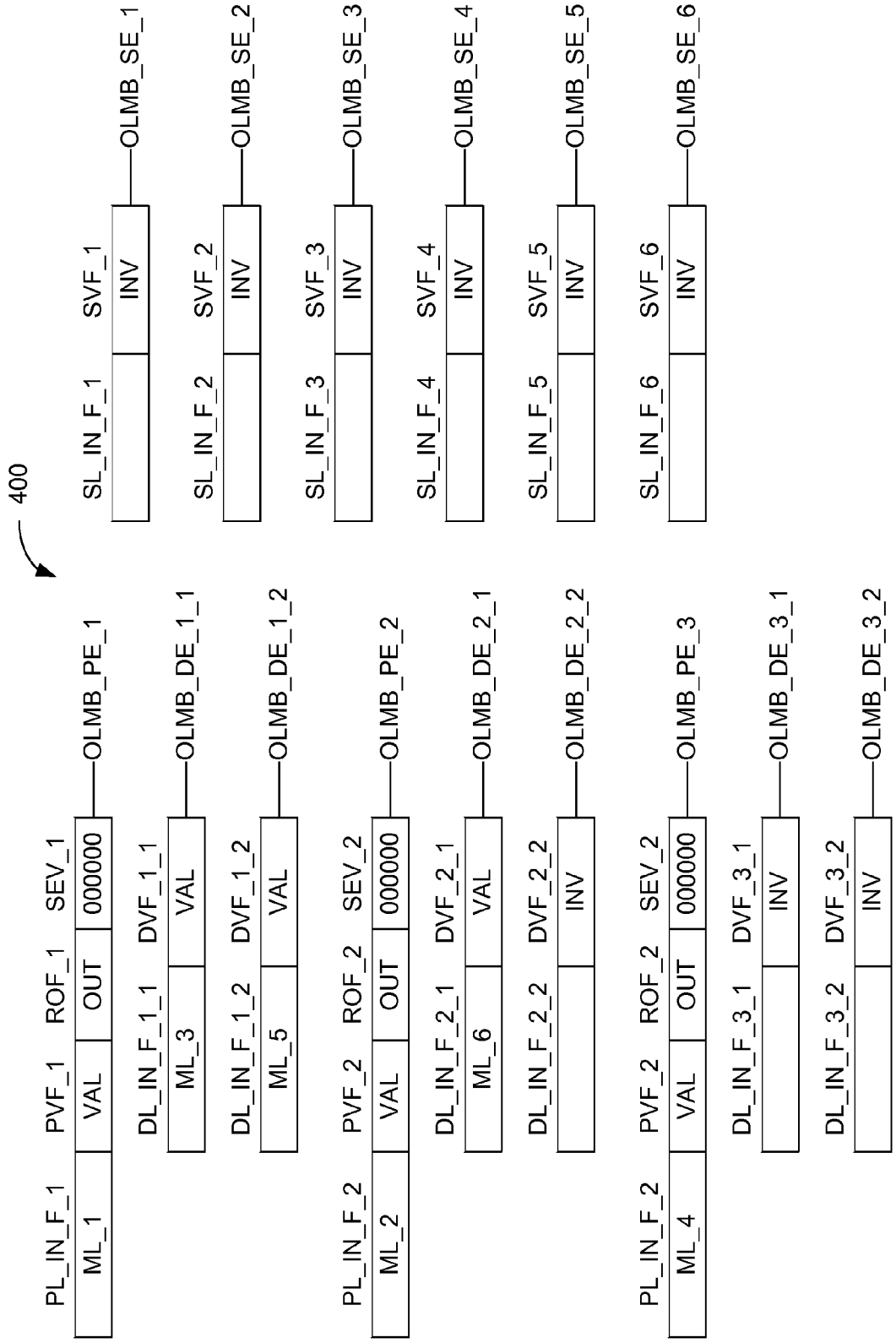

In FIG. 4F, missed load instruction ML_6 was issued and stored in outstanding load miss buffer 400. As stated above, missed load instruction ML_6 requests data from the same cache line as missed load instruction ML_2. Therefore, missed load instruction ML_6 is dependent on missed load instruction ML_2. Accordingly, missed load instruction ML_6 is stored in an OLMB dependent entry of OLMB primary entry OLMB_PE_2. Specifically, missed load instruction ML_6 is stored in dependent load instruction field DL_IN_F_2_1 in OLMB dependent entry OLMB_DE_2_1. In addition, dependent valid flag DVF_2_1 of OLMB dependent entry OLMB_DE_2_1 is set to valid state VAL.

Figure 4G:
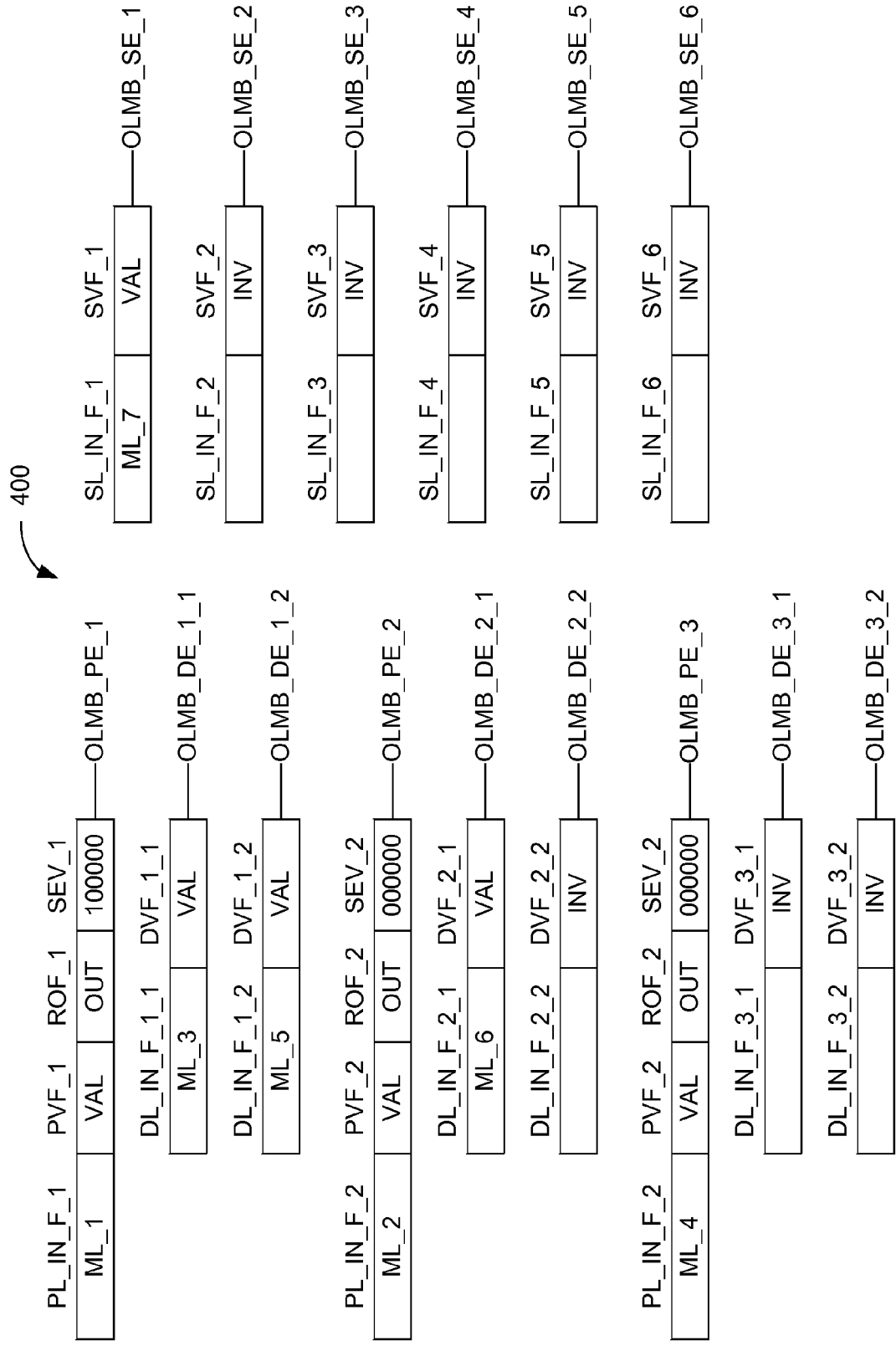

In FIG. 4G, missed load instruction ML_7 was issued and stored in outstanding load miss buffer 400. As stated above, missed load instruction ML_7 requests data from the same cache line as missed load instruction ML_1. Therefore, missed load instruction ML_7 is dependent on missed load instruction ML_1. Accordingly, missed load instruction ML_7 should be stored in an OLMB dependent entry of OLMB primary entry OLMB_PE_1. However, both OLMB dependent entries OLMB_DE_1_1 and OLMB_DE_1_2 are already being used. Therefore, missed load instruction ML_7 is stored in an OLMB shared entry. Specifically, missed load instruction ML_7 is stored in shared load instruction field SL_IN_F_in OLMB shared entry OLMB_SE_1. In addition, shared valid flag SVF_1 of OLMB shared entry OLMB_SE_1 is set to valid state VAL. Furthermore, shared entry vector SEV_1 of OLMB primary entry OLMB_PE_1 is set to 100000, which indicates that OLMB shared entry OLMB_SE_1 is associated with OLMB primary entry OLMB_PE_1.

Figure 4H:
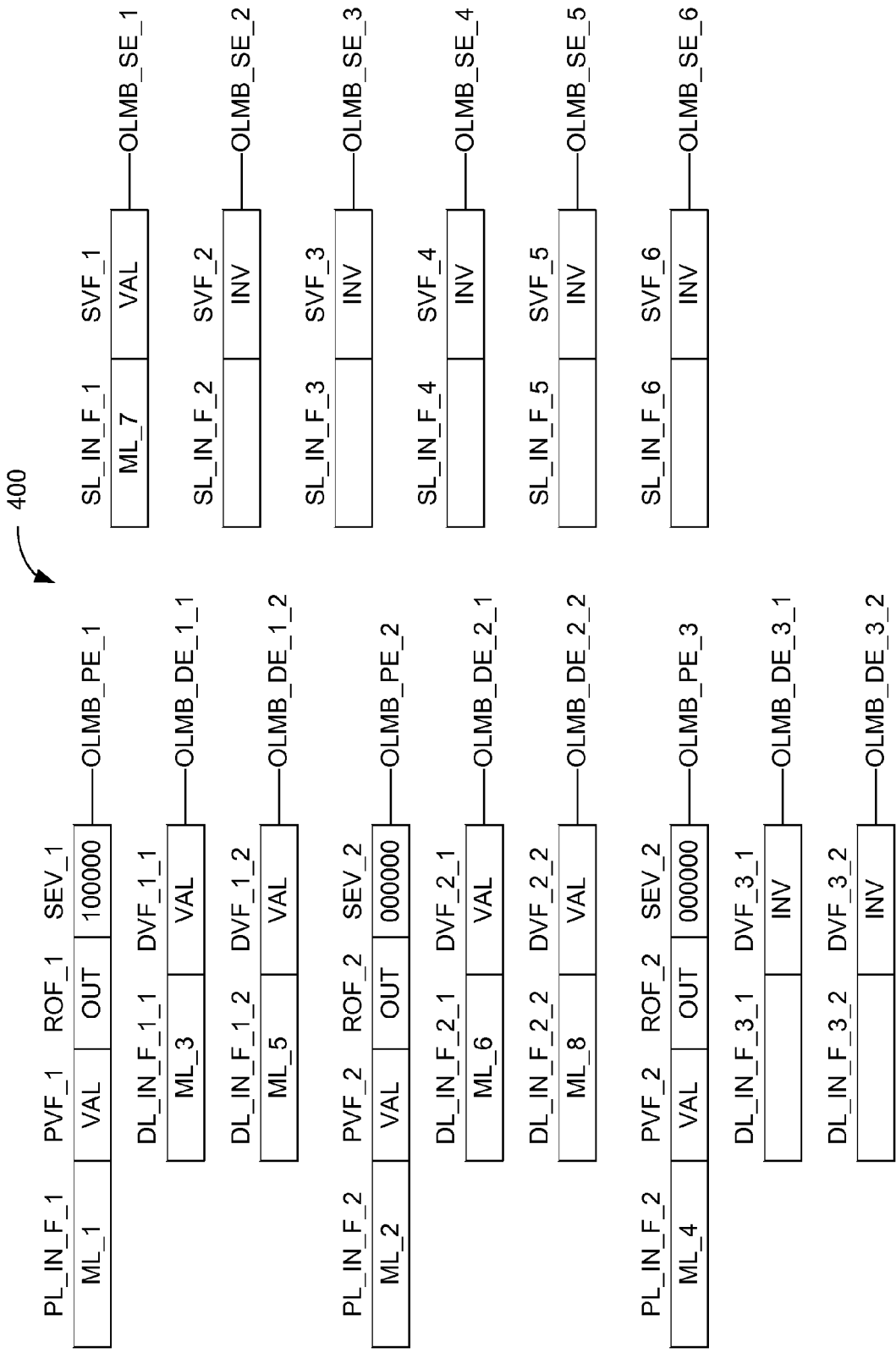

In FIG. 4H, missed load instruction ML_8 was issued and stored in outstanding load miss buffer 400. As stated above, missed load instruction ML_8 requests data from the same cache line as missed load instruction ML_2. Therefore, missed load instruction ML_8 is dependent on missed load instruction ML_2. Accordingly, missed load instruction ML_8 is stored in an OLMB dependent entry of OLMB primary entry OLMB_PE_2. Specifically, missed load instruction ML_8 is stored in dependent load instruction field DL_IN_2_2 in OLMB dependent entry OLMB_DE_2_2. In addition, dependent valid flag DVF_2_2 of OLMB dependent entry OLMB_DE_2_2 is set to valid state VAL.

Figure 4I:
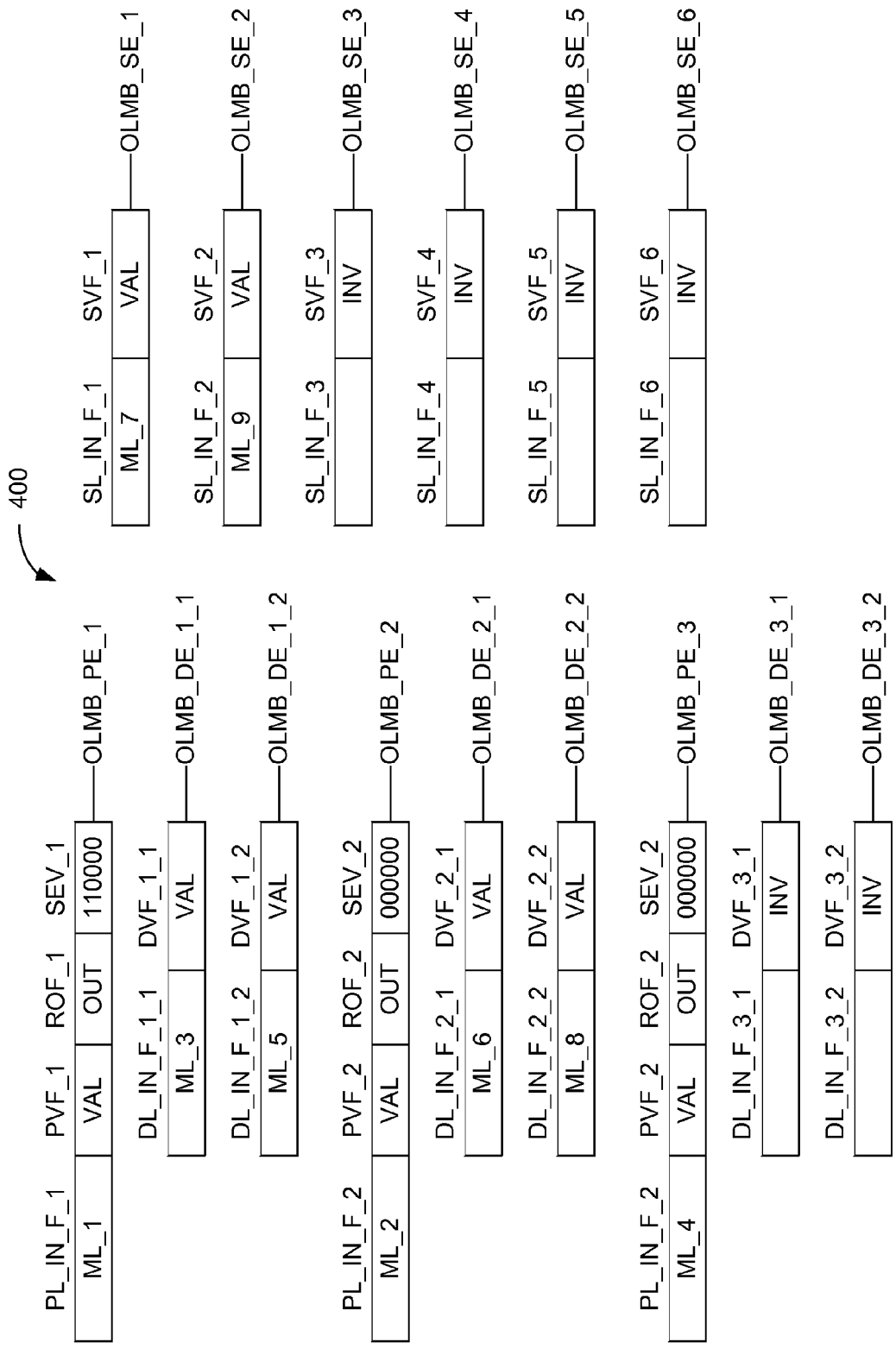

In FIG. 4I, missed load instruction ML_9 was issued and stored in outstanding load miss buffer 400. As stated above, missed load instruction ML_9 requests data from the same cache line as missed load instruction ML_1. Therefore, missed load instruction ML_9 is dependent on missed load instruction ML_1. Accordingly, missed load instruction ML_9 should be stored in an OLMB dependent entry of OLMB primary entry OLMB_PE_1. However, both OLMB dependent entries OLMB_DE_1_1 and OLMB_DE_1_2 are already being used. Therefore, missed load instruction ML_9 is stored in an OLMB shared entry. Specifically, missed load instruction ML_9 is stored in shared load instruction field SL_IN_F_in OLMB shared entry OLMB_SE_2. In addition, shared valid flag SVF_2 of OLMB shared entry OLMB_SE_2 is set to valid state VAL. Furthermore, shared entry vector SEV_1 of OLMB primary entry OLMB_PE_1 is set to 110000, which indicates that OLMB shared entry OLMB_SE_1 and OLMB_SE_2 are associated with OLMB primary entry OLMB_PE_1.

Figure 4J:
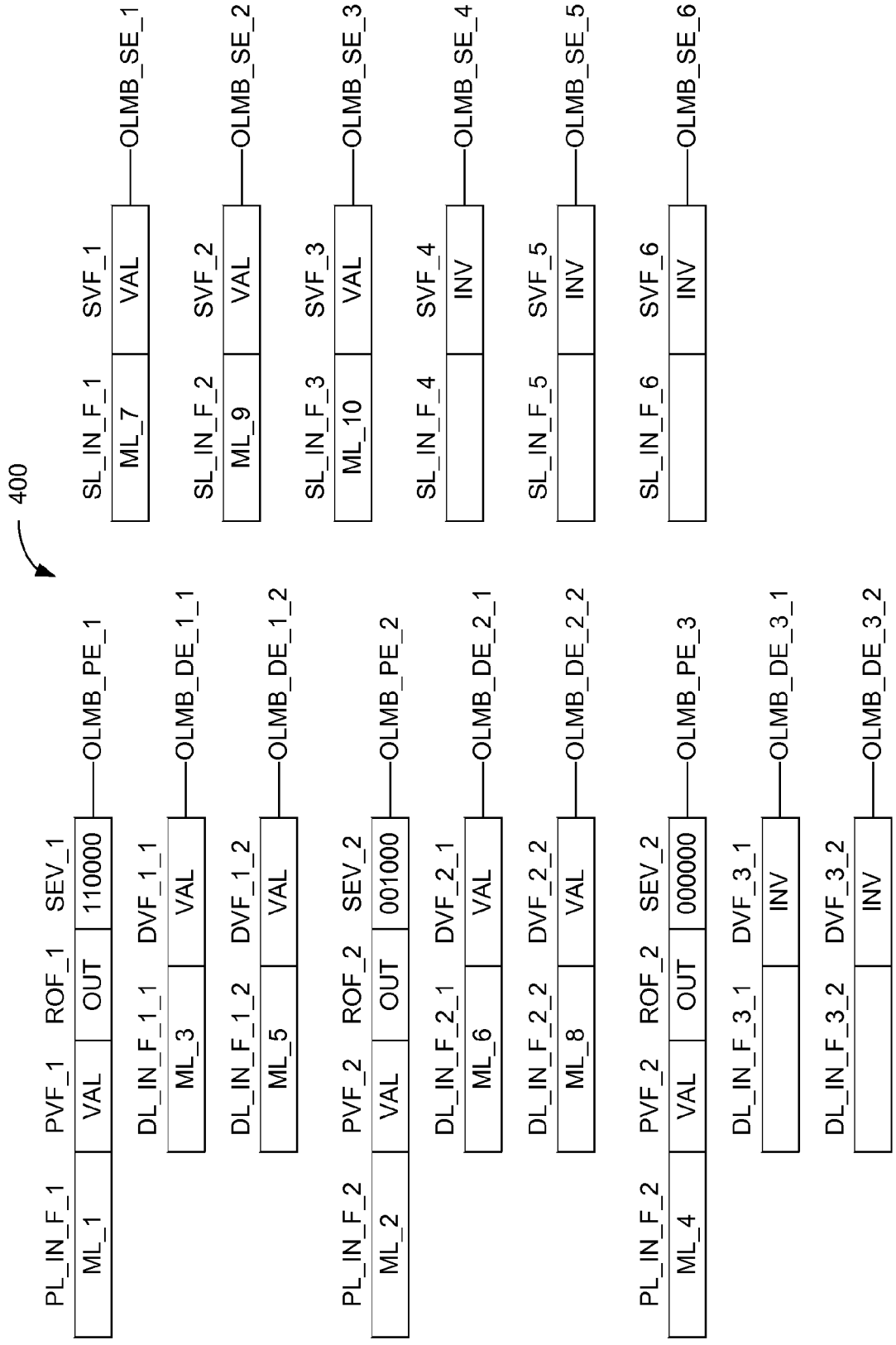

In FIG. 4J, missed load instruction ML_10 was issued and stored in outstanding load miss buffer 400. As stated above, missed load instruction ML_10 requests data from the same cache line as missed load instruction ML_2. Therefore, missed load instruction ML_10 is dependent on missed load instruction ML_2. Accordingly, missed load instruction ML_10 should be stored in an OLMB dependent entry of OLMB primary entry OLMB_PE_2. However, both OLMB dependent entries OLMB_DE_2_1 and OLMB_DE_2_2 are already being used. Therefore, missed load instruction ML_10 is stored in an OLMB shared entry. Specifically, missed load instruction ML_10 is stored in shared load instruction field SL_IN_F_in OLMB shared entry OLMB_SE_3. In addition, shared valid flag SVF_3 of OLMB shared entry OLMB_SE_3 is set to valid state VAL. Furthermore, shared entry vector SEV_2 of OLMB primary entry OLMB_PE_2 is set to 001000, which indicates that OLMB shared entry OLMB_SE_2 is associated with OLMB primary entry OLMB_PE_2. Additional missed load instructions can be stored similarly.

As explained above, when the cache line requested by a missed load instruction (or group of missed load instructions) becomes available to level one cache 142. The data is transferred into load miss result buffer 230 (FIG. 2). In some embodiments of the present invention, the data from level two memory sub-system 144 is transferred to load miss result buffer 230 and level one cache 142 in parallel. In other embodiments of the present invention, the data is first transferred into level one cache 142 and later transferred to load miss result buffer 230. After the data is load miss result buffer 230, the missed load instructions are then re-issued from outstanding load miss buffer 220. Alternatively, some embodiments of the present invention transfer the data into load miss result buffer 230 at the same time as an initial missed load instruction is re-issued. When the other missed load instructions are reissued data is retrieved from load miss result buffer 230 rather than from level one cache 142. Therefore, changes to the data in level one cache 142 would not cause data hazards with the missed load instructions. FIG. 5 is a block diagram of a load miss result buffer 500 in accordance with one embodiment of the present invention. Load miss result buffer 500 includes a plurality of load miss results buffer data lines (hereinafter referred to as LMRB data lines). The LMRB data lines are labeled LMRB_DL_k, where k can be 1 to K. Generally, K should be equal to the number of groups of missed load instruction that can be stored in the corresponding outstanding load miss buffer (See FIG. 2). For example, if load miss result buffer 500 were to be used with outstanding load miss buffer 400 (FIG. 4A-4) load miss result buffer 500 would have eight LMRB data lines each corresponding to a group of missed load instructions lead by each of the OLMB primary entries. Each LMRB data line in load miss result buffer 500 has the same width as a cache line in level one cache 142. Thus, when a cache line that is requested by one or more missed load instructions becomes available in level one cache 142, the requested cache line can be copied into one of the LMRB data lines of load miss result buffer 500. Then when the missed load instructions are reissued from the outstanding load miss buffer, data is retrieved from the load miss result buffer rather than the level one cache.

As explained above, in some embodiments of the present invention, the data from the requested cache line is transferred in conjunction with the re-issue of a missed load instruction. For example, when an initial missed load instruction from a group of missed load instructions is reissued, the data from the requested cache line is provided to load miss result buffer 500 (see FIG. 2 but with load miss result buffer 500 in place of load miss result buffer 230) and format block 240. Load miss result buffer 230 copies the entire cache line into a LMRB data line. While format block 240 formats data from the requested cache line in the form requested by the initial missed load instruction and provides the data to load pipeline 215. Later missed load instructions that requested the same cache line would receive data from load miss result buffer 500 rather than level one cache 142.

Figure 6:
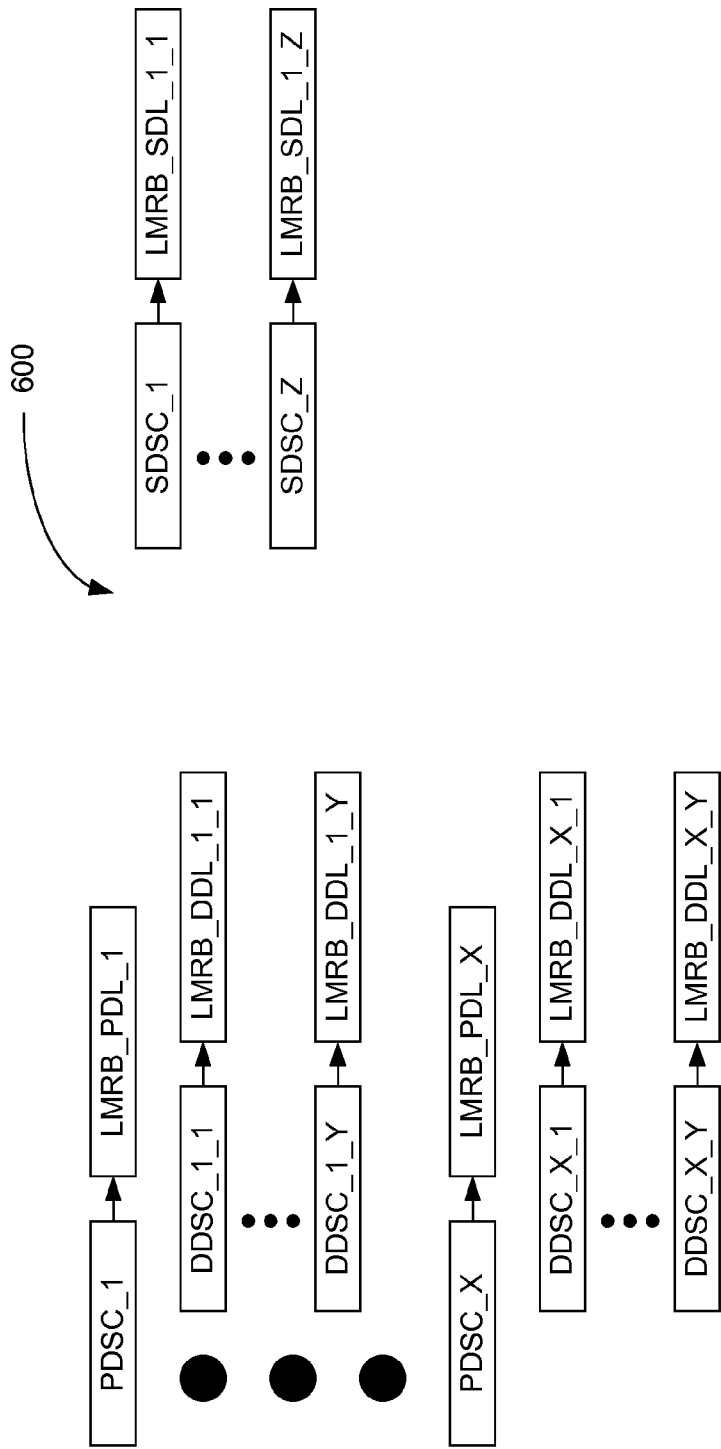
FIG. 6 is as simplified diagram of a load miss result buffer in accordance with one embodiment of the present invention.

One potential issue for the design of load miss result buffer 500 is the area required to include so much memory. For example level one cache 142 may have a cache line width of 64 bytes. Thus, an embodiment of load miss result buffer 500 with eight LMRB data lines would require 512 bytes of memory. FIG. 6 is a block diagram of a load miss result buffer 600 in accordance with another embodiment of the present invention. Load miss result buffer includes a plurality of load miss result buffer data lines (hereinafter LMRB data lines) as well as a plurality of data selection circuits. Specifically, load miss result buffer 600 includes a LMRB data line for each entry of a corresponding outstanding load miss buffer. However, the LMRB data lines of load miss result buffer 600 are much smaller than the LMRB data lines of load miss result buffer 500. Load miss result buffer 600 includes a data selection circuit for each LMRB data line. Load miss result buffer 600 works well with outstanding load miss buffer 300. For clarity, the reference names used to describe load miss result buffer 600 are similar to the reference names used with outstanding load miss buffer 300.

Load miss result buffer 600 includes a plurality of load miss result buffer primary data lines (hereinafter referred to as LMRB primary data lines). The LMRB primary data lines are labeled LMRB_PDL_x, where x can be 1 to X (i.e. there are X LMRB primary data lines). Each LMRB primary data line of load miss result buffer 600 includes a plurality of load miss result buffer dependent data lines (hereinafter referred to as LMRB dependent data lines), which are labeled LMBR_DDL_x_y, where y can be 1 to Y. Specifically, LMRB primary data line LMRB_PDL_1 has LMRB dependent data line LMRB_DDL_1_1 to LMRB dependent data line LMRB_DDL_1_Y and LMRB primary data line LMRB_PDL_X has LMRB dependent data line LMRB_DDL_X_1 to LMRB dependent data line LMRB_DDL_X_Y. In addition to the LMRB primary data lines and LMRB dependent data lines, load miss result buffer 600 also includes a plurality of load miss result buffer shared data lines (hereinafter LMRB shared data lines), which are labeled LMRB_SDL_z, where z can be 1 to Z.

Each data line of load miss result buffer 600 has a corresponding data selection circuit. For clarity the data selection circuits are referenced in a similar manner as the LMRB data lines. Thus for example, each LMRB primary data line LMRB_PDL_x is coupled to a primary switching circuit PDSC_x. Similarly each LMRB dependent data line LMRB_DDL_x_y is coupled to dependent data selection circuit DDSC_x_y and each LMRB shared data line LMRB_SDL_z is coupled to a shared data selection circuit SDSC_z.

The data selection circuits receive data from memory system 140. As explained above, in some embodiments of the present invention the data selection circuits would receive data from level one cache 142 in other embodiments of the present invention the data selection circuit receive data from level two memory sub-system 140 (See FIG. 2). The data selection circuits select the data that is requested by the missed load instruction in the corresponding OLMB entry of outstanding load miss buffer to be stored in the LMRB data line. In some embodiments the data from memory system 140 is first formatted by format block 240. Generally, all the data lines for a group of missed load instruction can be loaded with a single access to level one cache 142 or loaded in parallel with the data transfer from level two memory sub-system 144 to level one cache 142. When the missed load instructions are reissued data is read from the load miss result buffer instead of the level one cache 142.

Figure 7B:
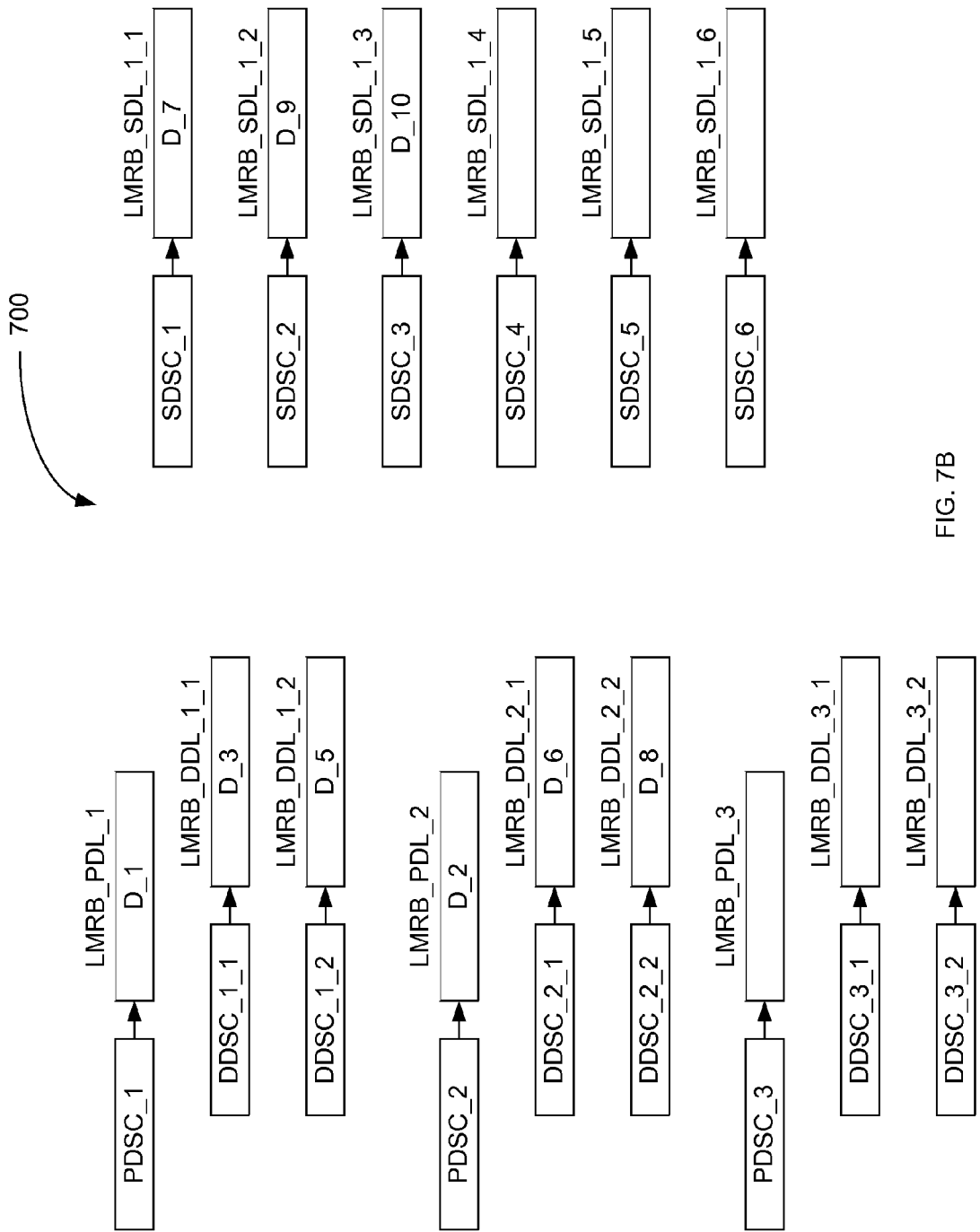
Figure 7C:
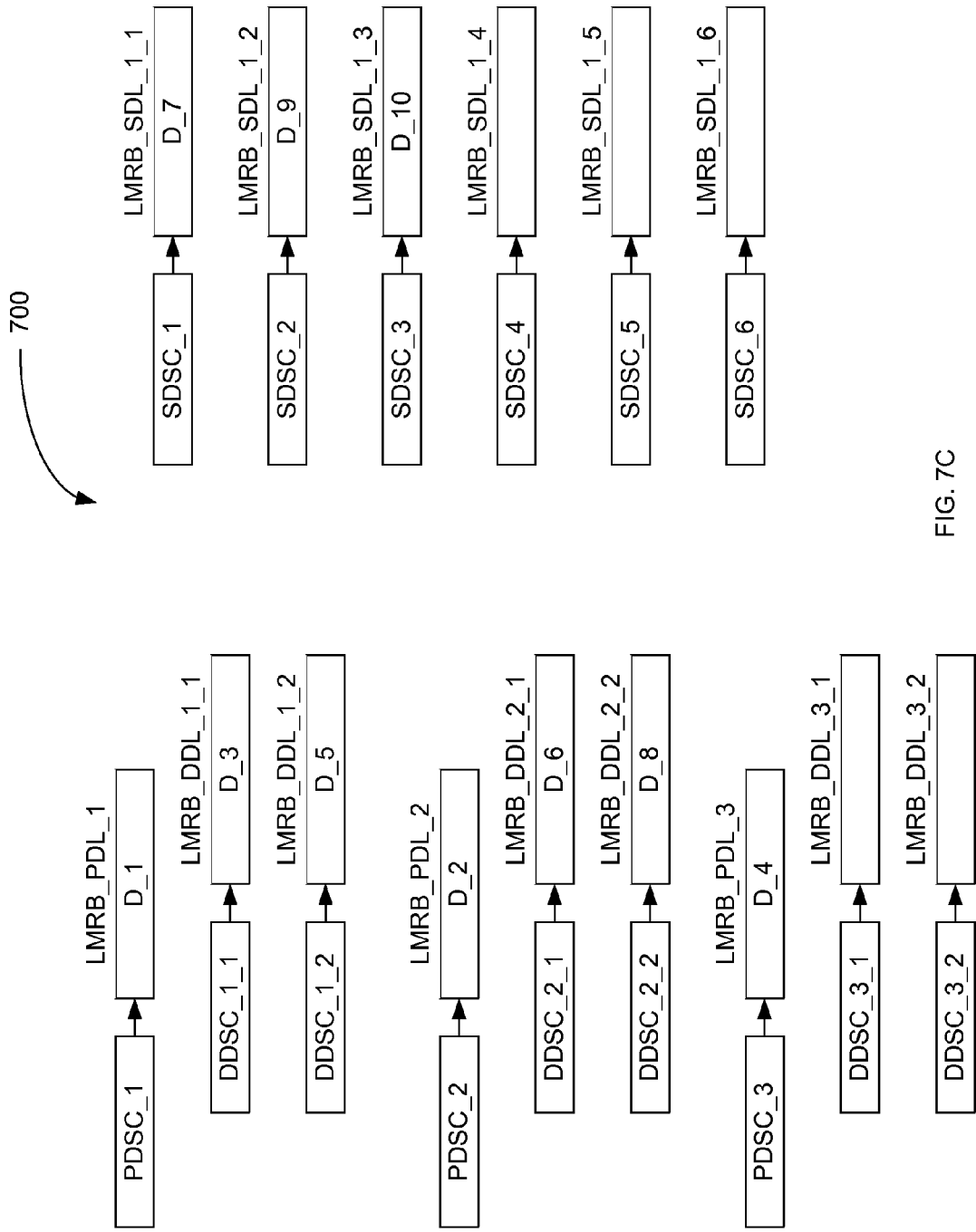

FIGS. 7A-7C continues the Example of FIG. 4A-4J, but shows a load miss result buffer 700 using the same design as load miss result buffer 600. As explained above, outstanding load miss buffer 400 (FIG. 4A-4J) includes 8 OLMB primary entries OLMB_PE_1, OLMB_PE_2, OLMB_PE_3, ... OLMB_PE_8. Therefore, load miss result buffer 700 includes 8 LMRB primary data lines LMRB_PDL_1, LMRB_PDL_2, LMRB_PDL_3, ... LMRB_PDL_8 and eight corresponding primary data selection circuits PDSC_1, PDSC_2, PDS_3, ... PDSC_8 (however for space reasons only the first 3 LMRB primary data lines and first 3 primary data selection circuits are shown). As explained above, each OLMB primary entry OLMB_PE_x of outstanding load miss buffer 400 includes two dependent entries OLMB_DE_x_1 and OLMB_DE_x_2. Therefore, load miss result buffer 600 includes two LMRB dependent data lines LMRB_DDL_x_1 and LMRB_DDL_x_2 and two corresponding dependent data selection circuits DDSC_x_1 and DDSC_x_2 for each LMRB primary data line LMRB_PDL_x (again for space reasons only the first 6 LMRB dependent data lines and first six dependent data selection circuits are shown). In addition, outstanding load miss buffer 400 includes six OLMB shared entries OLMB_SE_1, OLMB_SE_2, ... OLMB_SE_6. Therefore, load miss result buffer 700 includes six LMRB shared data lines LMRB_SDL_1, LMRB_SDL_2, ... LMRD_SDL_6 and six corresponding shared data selection circuits SDSC_1, SDSC_2, ... SCSC_6.

As explained above, ten missed load instructions ML_1, ML_2, ML_3, ML_4, ... ML_10 are issued stored in outstanding load miss buffer 400 (See FIG. 4J). For clarity each missed load instruction ML_x requested data unit D_x. For example, missed load instruction ML_5 requested data unit D_5. As explained above, missed load instructions ML_1, ML_3, ML_5, ML_7 and ML_9 are dependent therefore data units D_1, D_3, D_5, D_7 and D_9 are on a first cache line. Similarly, missed load instructions ML_2, ML_6, ML_8, and ML_9 are dependent and therefore data units D_2, D_6, D_8 and D_9 are on a second cache line. Missed instruction ML_4 is not dependent with the other missed load instructions; therefore, data unit D_4 is from a third cache line. When the first cache line is becomes available in level one cache 142 (FIG. 2) the requested data is copied into load miss result buffer 700 in the appropriate data lines. Generally, a cache access is made to level one cache 142, then a current cache line of data from level one cache is provided to all the data selection circuits. However, in some embodiments of the present invention, data is provided to the data selection circuits at the same time that data is being stored in level one cache 142. If the corresponding entry in outstanding load miss buffer 400 holds a missed load instruction that requests data from the current cache line, the data selection circuit selects the appropriate data unit and stores the data unit in the corresponding data line of load miss result buffer 700. In some embodiments of the present invention format block 240 (FIG. 2) may perform some formatting before the data units are stored.

Thus for example when the first cache line (with data for missed load instructions ML_1, ML_3, ML_5, ML_7, and ML_9) is retrieved from level one cache 142 data (or as in other embodiments of the present invention when the first cache line is stored in level one cache 142), primary data selection circuit PDSC_1 selects data unit D_1 and stores data unit D_1 into LMRB primary data line LMRB_PDL_1 as illustrated in FIG. 7A. Dependent data selection circuit DDSC_1_1 selects data unit D_3 and stores data unit D_3 into LMRB dependent data line LMRB_DDL_1_1. Dependent data selection circuit DDSC 1_2 selects data unit D_5 and stores data unit D_5 into LMRB dependent data line LMRB_DDL_1_2. Shared data selection circuit SDSC_1 selects data unit D_7 and stores data unit D_7 into LMRB shared data line LMRB_SDL_1. Shared data selection circuit SDSC_2 selects data unit D_9 and stores data unit D_9 into LMRB shared data line LMRB_SDL_2.

FIG. 7B shows the contents of load miss result buffer 700 after data from the second cache line (with data requested by missed load instructions ML_2, ML_6, ML_8, and ML_10) is copied into load miss result buffer 700. Specifically, primary data selection circuit PDSC_2 selects data unit D_2 and stores data unit D_2 into LMRB primary data line LMRB_PDL_2. Dependent data selection circuit DDSC_2_1 selects data unit D_6 and stores data unit D_6 into LMRB dependent data line LMRB_DDL_2_1. Dependent data selection circuit DDSC_2_2 selects data unit D_8 and stores data unit D_8 into LMRB dependent data line LMRB_DDL_2_2. Shared data selection circuit SDSC_3 selects data unit D_10 and stores data D_10 unit into LMRB shared data line LMRB_SDL_3.

FIG. 7C shows the contents of load miss result buffer 700 after data from the third cache line (with data requested by missed load instructions ML_4) is copied into load miss result buffer 700. Specifically, primary data selection circuit PDSC_3 selects data unit D_4 and stores data unit D_4 into LMRB primary data line LMRB_PDL_3.

Because the data lines in load miss result buffers 600 and 700 only store the requested data rather than an entire cache line, the data lines in load miss result buffers 600 and 700 are much smaller than the data lines in load miss result buffer 500. For example, in one embodiment of the present invention, the width of a cache line is 64 bytes. Therefore a load miss result buffer using the same design as load miss result buffer 500 that supports eight groups of missed load instruction would require 8 data lines that are each 64 bytes wide for a total of 512 bytes. However, load miss result buffer 700 uses 30 data lines (8 Primary, 16 dependent, and 6 shared) that are 8 bytes wide for a total of 240 bytes of memory. Thus even with the extra area required by the data selection circuits, load miss result buffer 700 can be smaller than load miss result buffer 500.

Furthermore, some embodiments of the present invention can be made even smaller than load miss result buffer 700. As explained above a cache access is made to level one cache 142 so that the data from a requested cache line can be copied into the load miss result buffer. However, in some embodiment of the present invention this cache access is made only when a first missed load instruction is re-issued. Thus the cache access that loads the load miss result buffer is also used to retrieve a data unit for the first missed load instruction of a group of dependent missed load instruction. Therefore, the load miss result buffer would not need a data line for the first missed load instruction. Thus, for example in a specific embodiment of the present invention, the load miss result buffer would not include LMRB primary data lines or primary data selection circuits. In these embodiments, the missed load instructions in OLMB primary entries are re-issued before other missed load instructions in the group of missed load instructions. By eliminating the LMRB primary data lines, the memory requirement of the load miss result buffer is reduced to 176 bytes of data.

Other than embodiments of the invention that use the same cache access to re-issue a missed load instruction and load data into the load miss result buffer, the missed load instructions are re-issued within a group of missed load instructions can be re-issued in any order. Some embodiments may re-issue the missed load instructions in the shared entries first so that the shared entries can be used by other groups of dependent missed load instructions. Other embodiments may re-issue the instruction in the same order as they were received. For embodiments that that use the same cache access to re-issue a missed load instruction and load data into the load miss result buffer the missed load instruction that is in the OLMB entry that does not have a corresponding LMRB data line should be re-issued first.

In the various embodiments of the present invention, novel methods and systems have been described for storing and re-issuing missed load instructions. By using a outstanding load miss buffer and a load missed result buffer data hazards for dependent missed load instructions can be eliminated. The various embodiments of the structures and methods of this invention that are described above are illustrative only of the principles of this invention and are not intended to limit the scope of the invention to the particular embodiments described. For example, in view of this disclosure those skilled in the art can define other load schedulers, outstanding load miss buffers, load miss result buffers, OLMB entries, LMRB data lines, data selection circuits, format blocks, load pipelines, caches, and so forth, and use these alternative features to create a method, or system according to the principles of this invention. Thus, the invention is limited only by the following claims.

What is claimed is:

1. A load miss result buffer for a load/store unit with a load pipeline and configured to access a memory system having a level one cache and a level two memory sub-system, the load miss result buffer comprising:
    a first plurality of dependent data lines;
    a first plurality of dependent data selection circuits, wherein each dependent data line of the first plurality of dependent data lines is coupled to an associated dependent data selection circuit of the first plurality of dependent data selection circuits and configured to receive data from the memory system;
    a second plurality of dependent data lines;
    a second plurality of dependent data selection circuits, wherein each dependent data line of the second plurality of dependent data lines is coupled to an associated dependent data selection circuit of the second plurality of dependent data selection circuits and configured to receive data from the memory system;
    a plurality of shared data lines; and
    a plurality of shared data selection circuits, wherein each shared data line of the plurality of shared data lines is coupled to an associated shared data selection circuit of the plurality of shared data selection circuits and configured to receive data from the memory system.

2. The load miss result buffer of claim 1, wherein each of the dependent data selection circuit of the first plurality of dependent data selection circuits is configured to select a subset of the data from the memory system for storing in the associated dependent data line.

3. The load miss result buffer of claim 2, wherein each of the shared data selection circuit of the plurality of shared data selection circuits is configured to select a subset of the data from the memory system for storing in the associated shared data line.

4. The load miss result buffer of claim 3, wherein at least one dependent data line of the first plurality of dependent data line and at least one shared data line receives data during a single memory access.

5. The load miss result buffer of claim 4, wherein data is also provided to the load pipeline during the single memory access.

6. The load miss result buffer of claim 1, wherein the dependent data selection circuits of the first plurality of dependent data selection circuit, the dependent data selection circuits of the second plurality of dependent data selection circuit, and the shared data selection circuit are configured to receive data from the level two memory sub-system.

7. The load miss result buffer of claim 6, wherein data is presented to the dependent data selection circuits of the first plurality of dependent data selection circuit, the dependent data selection circuits of the second plurality of dependent data selection circuit, the shared data selection circuits and the level one cache during a single memory access to the level two memory sub-system.

8. The load miss result buffer of claim 7, wherein data from the level two memory sub-system is also provided to the load pipeline during the single memory access.

9. The load miss result buffer of claim 1, wherein the dependent data selection circuits of the first plurality of dependent data selection circuit, the dependent data selection circuits of the second plurality of dependent data selection circuit, and the shared data selection circuit are configured to receive data from the level one cache.

10. The load miss result buffer of claim 9, wherein data is presented to the dependent data selection circuits of the first plurality of dependent data selection circuit, the dependent data selection circuits of the second plurality of dependent data selection circuit, and the shared data selection circuits during a single memory access to the level one cache.

11. The load miss result buffer of claim 10, wherein data from the level one cache is also provided to the load pipeline during the single memory access.

12. The load miss result buffer of claim 1, further comprising:
   a first primary data line;
   a first primary data selection circuit coupled to the first primary data line and configured to receive data from the memory system;
   a second primary data line; and
   a second primary data selection circuit coupled to the second primary data line and configured to receive data from the memory system.

13. A method of operating a load miss result buffer coupled to a load pipeline and a memory system having a level one cache and a level two memory sub-system, the method comprising:
   transferring a missed load instruction to an outstanding load miss buffer;
   transferring a dependent missed load instruction to the outstanding load miss buffer and grouping the dependent missed load instruction and the missed load instruction;
   in response to a data line being determined to have been transferred to the level one cache, transferring the data line to the load miss result buffer, wherein the data line is associated with the missed load instruction and the dependent missed load instruction; and
   reissuing the missed load instruction and the dependent missed load instruction and directing the missed load instruction and the dependent missed load instruction to read the data line from the load miss result buffer.

14. The method of claim 13, wherein the data line is from the level two memory sub-system.

15. The method of claim 14, further comprising transferring the data line to the level one cache during a memory access.

16. The method of claim 13, further comprising loading a shared data line of the load miss result buffer with a data unit from the memory system during a memory access.

17. The method of claim 16, further comprising transferring a second data unit to the load pipeline.

18. The method of claim 17, wherein the missed load instruction is reissued to initiate the transferring the data unit to the load pipeline.

19. The method of claim 16, further comprising transferring the second data unit to the load pipeline.

20. The method of claim 19, wherein the dependent missed load instruction is reissued to initiate the transferring the second data unit to the load pipeline.

21. The method of claim 13, reissuing the dependent missed load instruction after reissuing the missed load instruction.

22. The method of claim 13, issuing other load instructions while the missed load instruction is held in the outstanding load miss buffer.

23. A load miss result buffer coupled to a load pipeline and a memory system having a level one cache and a level two memory sub-system, the load miss result buffer comprising:
   means for transferring a missed load instruction to an outstanding load miss buffer;
   means for transferring a dependent missed load instruction to the outstanding load miss buffer and grouping the dependent missed load instruction and the missed load instruction;
   in response to a data line being determined to have been transferred to the level one cache, means for transferring the data line to the load miss result buffer, wherein the data line is associated with the missed load instruction and the dependent missed load instruction; and
   means for reissuing the missed load instruction and the dependent missed load instruction and directing the missed load instruction and the dependent missed load instruction to read the data line from the load miss result buffer.

24. The load miss result buffer of claim 23, wherein the data line is from the level two memory sub-system.

25. The load miss result buffer of claim 24, further comprising means for transferring the data line to the level one cache during a first memory access.

26. The load miss result buffer of claim 23, further comprising means for issuing other load instructions while the missed load instruction is held in the outstanding load miss buffer.

* * * * *